United States Patent [19]
Takada et al.

[11] Patent Number: 5,805,438
[45] Date of Patent: Sep. 8, 1998

[54] CURRENT CONTROLLED PWM INVERTER FOR DRIVING A MOTOR WITHOUT GAIN ADJUSTMENT

[75] Inventors: Kazuyuki Takada, Hirakata; Yoshinori Isomura, Itami, both of Japan

[73] Assignee: Matsushita Electric Industrial Co., Ltd., Osaka, Japan

[21] Appl. No.: 788,338

[22] Filed: Jan. 27, 1997

[30] Foreign Application Priority Data

Jan. 31, 1996 [JP] Japan ................................ 8-014953

[51] Int. Cl.$^6$ .................................................... H02M 7/797
[52] U.S. Cl. ............................................. 363/98; 363/132
[58] Field of Search ............................... 363/95, 98, 132

[56] References Cited

U.S. PATENT DOCUMENTS

| | | | |
|---|---|---|---|
| 4,760,316 | 7/1988 | Hedlund | 318/254 |
| 4,841,207 | 6/1989 | Cheyne | 318/139 |
| 5,159,542 | 10/1992 | Miller et al. | 363/95 |
| 5,214,575 | 5/1993 | Sugishima et al. | 363/98 |
| 5,369,353 | 11/1994 | Erdman | 363/98 |
| 5,407,027 | 4/1995 | Suzuki et al. | 363/98 |
| 5,585,708 | 12/1996 | Richardson et al. | 363/132 |

*Primary Examiner*—Jeffrey L. Sterrett
*Attorney, Agent, or Firm*—Greenblum & Bernstein P.L.C.

[57] ABSTRACT

A low-cost, completely adjustment-free current-controlled PWM inverter substantially solving the conventional problems associated with the gain adjustment of a current error amplifier is provided. The current-controlled PWM inverter comprises a motor current detector, a main circuit power controller, a current comparator, a timing signal generator, and a switching control signal generator configured such that the switching control signal generator sets the switching control signal to switch the main circuit switching power elements on or off at the refresh timing and at the timing at which the current comparison result state changes.

17 Claims, 23 Drawing Sheets

CURRENT CONTROLLED PWM INVERTER FOR DRIVING A MOTOR WITHOUT GAIN ADJUSTMENT

BACKGROUND OF THE INVENTION

1. Field of the Invention

The present invention relates to a current-controlled PWM inverter used for drive control of a three-phase motor.

2. Description of the Prior Art

Current-controlled PWM inverters are widely used today for the drive control of such three-phase motors as induction motors, synchronous motors, and reactance motors.

While a voltage-controlled PWM inverter is controlled to apply a specified voltage to a motor, a current-controlled PWM inverter is controlled to force a specific current supply to a motor, and thereby achieves superior response and control characteristics compared with a voltage-controlled PWM inverter.

The configuration of a common current-controlled PWM inverter is described below with reference to FIG. 19 using by way of example a brushless motor. As shown in FIG. 19, a current control signal iT specifying the current to be supplied to the motor 1 is output from current control signal generator 7.

The motor current detector 2 then detects two of the line currents supplied to the motor 1, obtains the remaining ' one line current by obtaining the sum of the two detected line currents and inverting the sign, and then outputs the results as the first line current detection result iFU, second line current detection result iFV, and third line current detection result iFW. Note that the motor current detector 2 may also directly detect the three line currents input to the motor 1 and output the results as the first line current detection result iFU, second line current detection result iFV, and third line current detection result iFW.

The rotator position detector 3 then detects the relative positions of the rotator and stator of the motor 1, and outputs the rotator position detection result KC.

The current control signal iT is supplied to the current control means 64. Also supplied to the current control means 64 are the first line current detection result iFU, second line current detection result iFV, third line current detection result iFW, and rotator position detection result KC from the motor current detector 2 and rotator position detector 3. The current control means 64 then generates a first switching control signal PHU, a second switching control signal PHV, a third switching control signal PHW, a fourth switching control signal PLU, a fifth switching control signal PLV, and a sixth switching control signal PLW so that the current control signal iT matches the line current detection result of the line connected to the one main circuit switching power element, specifically first main circuit switching power element Q1, second main circuit switching power element Q2, or third main circuit switching power element Q3, in an ON state.

The main circuit power controller 8 comprises a primary DC power supply 5 and a main circuit power element group 4 having a three-phase bridged configuration. The main circuit power element group 4 specifically comprises the first main circuit switching power element Q1, which is connected to the positive terminal of the primary DC power supply 5 and supplies a first line current IU to the motor 1; the second main circuit switching power element Q2, which is connected to the positive terminal of the primary DC power supply 5 and supplies a second line current IV to the motor 1; the third main circuit switching power element Q3, which is connected to the positive terminal of the primary DC power supply 5 and supplies a third line current IW to the motor 1; a fourth main circuit switching power element Q4, which is connected to the negative terminal of the primary DC power supply 5 to supply the first line current IU to the motor 1; a fifth main circuit switching power element Q5, which is connected to the negative terminal of the primary DC power supply 5 to supply the second line current IV to the motor 1; and a sixth main circuit switching power element Q6, which is connected to the negative terminal of the primary DC power supply 5 to supply the third line current IW to the motor 1.

As a result, the main circuit power controller 8 switches the first main circuit switching power element Q1 on or off according to the first switching control signal PHU, switches the second main circuit switching power element Q2 on or off according to the second switching control signal PHV, switches the third main circuit switching power element Q3 on or off according to the third switching control signal PHW, switches the fourth main circuit switching power element Q4 on or off according to the fourth switching control signal PLU, switches the fifth main circuit switching power element Q5 on or off according to the fifth switching control signal PLV, and switches the sixth main circuit switching power element Q6 on or off according to the sixth switching control signal PLW.

Note that the main circuit power controller 8 as described herein is designed to switch the first main circuit switching power element Q1 on when the first switching control signal PHU becomes HIGH, and switch the first main circuit switching power element Q1 off when the first switching control signal PHU becomes LOW; switch the fourth main circuit switching power element Q4 on when the fourth switching control signal PLU is HIGH, and off when the fourth switching control signal PLU is LOW; switch the second main circuit switching power element Q2 on when the second switching control signal PHV is HIGH, and off when the second switching control signal PHV is LOW; switch the fifth main circuit switching power element Q5 on when the fifth switching control signal PLV is HIGH, and off when the fifth switching control signal PLV is LOW; switch the third main circuit switching power element Q3 on when the third switching control signal PHW is HIGH, and off when the third switching control signal PHW is LOW; and switch the sixth main circuit switching power element Q6 on when the sixth switching control signal PLW is HIGH, and off when the sixth switching control signal PLW is LOW.

The operation of a common conventional current-controlled PWM inverter system thus comprised is described next below with reference to FIG. 20.

FIG. 20 is a circuit diagram showing the conventional configuration of the current control means shown in FIG. 19, a block diagram of the current-controlled PWM inverter system described above.

First, the difference between the current control signal iT and the first, second, or third line current detection result iFU, iFV, or iFW obtained from the main circuit switching power element that is on is obtained by the subtracter 65 to obtain line current error signal iE. The current difference amplifier 66 then outputs the voltage control signal VE based on the supplied line current error signal iE. A proportional integrating type amplifier as shown in FIG. 21 is commonly used for the current difference amplifier 66 of which the gain characteristic is obtained by the equation $$G = \{R2 \times (R3C1S+1)\} / [R1 \times \{(R2+R3)C1S+1\}].$$

The PWM signal generator 67 comprises a main circuit switching power element selector 68, a first comparator 69, and a back-to-back sawtooth wave generator 70.

The first comparator 69 compares the triangular wave signal SC output from the back-to-back sawtooth wave generator 70 with the voltage control signal VE to output the switching control signal PH. Note that the switching control signal PH is output LOW when the voltage control signal VE is greater than the triangular wave signal SC, and HIGH when the voltage control signal VE is less than the triangular wave signal SC. The main circuit switching power element selector 68 outputs the first, second, third, fourth, fifth, and sixth selection signals S1, S2, S3, S4, S5, and S6 based on the rotator position detection result KC as shown in FIG. 22.

Note that the first, second, and third selection signals S1, S2, and S3 are output directly as the first, second, and third switching control signals PHU, PHV, and PHW, and the fourth, fifth, and sixth selection signals S4, S5, and S6 are combined in an AND operation with the switching control signal PH to generate and output the fourth, fifth, and sixth switching control signals PLU, PLV, and PLW.

FIG. 23 is a graph of the operation of the current control means shown in FIG. 19.

With this type of current-controlled PWM inverter, increasing the gain of the current error amplifier causes each of the line current control signals to approach the corresponding line current detection result, thus reducing the line current error and improving the response of the line current detection result to the line current control signals.

The current error gain is generally set as high as possible within the non-oscillating range because oscillation occurs as a result of phase delay resulting from the electrical time constant of the motor, phase delay in the current error amplifier, or dead time delay in the PWM signal generator if the gain of a current error amplifier is set too high. The gain of this current error amplifier is determined by studying the open loop transfer function of the current control loop based on the characteristics of the motor, motor current detector, current control means, and main circuit power controller. The gain must also be lowered sufficiently to prevent oscillation even in a worst-case scenario considering temperature characteristics and variations in characteristics resulting from the manufacturing process. As a result, determining this gain characteristic is a labor-intensive design task. What's more, even if the design of the current-controlled PWM inverter remains constant, the gain characteristic must be adjusted according to the motor connected to the current-controlled PWM inverter, thus adding to the design parameters that must be controlled during the manufacturing process.

Moreover, when the specifications of the motor to be connected to the current-controlled PWM inverter are not fixed when designing the current-controlled PWM inverter, the motor to be connected must be hypothetically determined and the gain then adjusted according to the motor specifications. Adjusting the gain thus adds another step to and slows the manufacturing process.

Next, because the offset and drift of the back-to-back sawtooth wave generator and current error amplifier degrade the current control error and limit the dynamic range, an operating amplifier with minimal offset and drive is required for these parts. In some cases an offset adjustment step must be added to the manufacturing process, further increasing cost.

SUMMARY OF THE INVENTION

Therefore, the object of the present invention is to resolve the above problems by providing a low cost current-controlled PWM inverter requiring absolutely no gain adjustment while providing outstanding response in the line current detection results.

To achieve the above object, a current-controlled PWM inverter according to the present invention comprises a motor current detection means for directly or indirectly detecting the line current inflowing from each line of a three-phase motor, and outputting a first line current detection result, a second line current detection result, and a third line current detection result; a current control signal for controlling the line current supplied from each line to the three-phase motor; a main circuit power element group comprising plural main circuit switching power elements in a three-phase bridge configuration comprising a current-circulating diode; a direct current primary power supply for supplying power to said power element group; a current comparing means for outputting a LOW current comparison result only when the first line current detection result, second line current detection result, and third line current detection result are all lower than the current control signal, and outputting a HIGH current comparison result in all other cases; a timing signal generator for outputting a refresh timing signal; and a switching control signal generator to which said current comparison result and refresh timing signal are input for generating the switching control signal that sets the main circuit switching power elements of the main circuit power element group on or off. In a current-controlled PWM inverter thus configured, the switching control signal generator determines the switching control signal controlling the on or off state of the main circuit switching power elements of the main circuit power element group at the refresh timing and at the timing at which the current comparison result changes from LOW to HIGH.

Alternatively, a current-controlled PWM inverter according to the present invention comprises a motor current detection means for directly or indirectly detecting the line current inflowing from each line of a three-phase motor, and outputting a first line current detection result, a second line current detection result, and a third line current detection result; a current control signal for controlling the line current supplied from each line to the three-phase motor; a main circuit power element group comprising plural main circuit switching power elements in a three-phase bridge configuration comprising a current-circulating diode; a direct current primary power supply for supplying power to said power element group; a current comparing means for outputting a HIGH current comparison result only when the first line current detection result, second line current detection result, and third line current detection result are all higher than the current control signal, and outputting a LOW current comparison result in all other cases; a timing signal generator for outputting a refresh timing signal; and a switching control signal generator to which said current comparison result and refresh timing signal are input for generating the switching control signal that sets the main circuit switching power elements of the main circuit power element group on or off. In a current-controlled PWM inverter thus configured, the switching control signal generator determines the switching control signal controlling the on or off state of the main circuit switching power elements of the main circuit power element group at the refresh timing and at the timing at which the current comparison result changes from HIGH to LOW.

Alternatively, a current-controlled PWM inverter according to the present invention comprises a motor current detection means for directly or indirectly detecting the line current inflowing from each line of a three-phase motor, and outputting a first line current detection result, a second line current detection result, and a third line current detection result; a current control signal for controlling the line current supplied from each line to the three-phase motor; a main circuit power element group comprising plural main circuit switching power elements in a three-phase bridge configuration comprising a current-circulating diode; a direct current primary power supply for supplying power to said power element group; a current comparing means for outputting a LOW current comparison result only when the absolute value of the first line current detection result, the absolute value of the second line current detection result, and the absolute value of the third line current detection result are all lower than the current control signal, and outputting a HIGH current comparison result in all other cases; a timing signal generator for outputting a refresh timing signal; and a switching control signal generator to which said current comparison result and refresh timing signal are input for generating the switching control signal that sets the main circuit switching power elements of the main circuit power element group on or off. In a current-controlled PWM inverter thus configured, the switching control signal generator determines the switching control signal controlling the on or off state of the main circuit switching power elements of the main circuit power element group at the refresh timing and at the timing at which the current comparison result changes from LOW to HIGH.

It is therefore possible by means of the present invention thus comprised to achieve a low cost current-controlled PWM inverter providing outstanding response to the line current detection results without requiring gain adjustment.

A current-controlled PWM inverter according to the first aspect of the invention comprises a motor current detection means for directly or indirectly detecting the line current inflowing from each line of a three-phase motor, and outputting a first line current detection result, a second line current detection result, and a third line current detection result; a current control signal for controlling the line current supplied from each line to the three-phase motor; a main circuit power element group comprising plural main circuit switching power elements in a three-phase bridge configuration comprising a current-circulating diode; a direct current primary power supply for supplying power to said power element group; a current comparing means for outputting a LOW current comparison result only when the first line current detection result, second line current detection result, and third line current detection result are all lower than the current control signal, and outputting a HIGH current comparison result in all other cases; a timing signal generator for outputting a refresh timing signal; and a switching control signal generator to which said current comparison result and refresh timing signal are input for generating the switching control signal that sets the main circuit switching power elements of the main circuit power element group on or off. This current-controlled PWM inverter is configured such that the switching control signal generator determines the switching control signal controlling the on or off state of the main circuit switching power elements of the main circuit power element group at the refresh timing and at the timing at which the current comparison result changes from LOW to HIGH.

By means of this configuration, the current-controlled PWM inverter repeats a simple operation determining whether the first, second, third, fourth, fifth, and sixth main circuit switching power elements are on or off at the refresh timing and at the timing at which the current comparison result changes so that the difference between the current control signal and the line current detection result decreases. As a result, the line current of the three-phase motor approaches the current control signal and the current error can be decreased.

Furthermore, because the current-controlled PWM inverter of the present invention does not contain a current error amplifier, the problems associated with adjusting the gain of a current error amplifier are fundamentally eliminated, and there is absolutely no need for any gain adjustment.

The current-controlled PWM inverter also operates to continuously minimize current error even if the three-phase motor, current comparing means, or main circuit switching power element group characteristics and specifications change by design or as a result of manufacturing variations or temperature characteristics. The current control response characteristic is therefore also excellent, and there are no concerns about oscillation occurring.

Except for the current comparing means, the current control means in the current-controlled PWM inverter of the present invention can also be completely constructed from simple digital circuits. Such digital circuit components are also essentially free from offset and drift problems, and can be manufactured at low cost.

A current-controlled PWM inverter according to the second aspect of the invention comprises a motor current detection means for directly or indirectly detecting the line current inflowing from each line of a three-phase motor, and outputting a first line current detection result, a second line current detection result, and a third line current detection result; a current control signal for controlling the line current supplied from each line to the three-phase motor; a main circuit power element group comprising plural main circuit switching power elements in a three-phase bridge configuration comprising a current-circulating diode; a direct current primary power supply for supplying power to said power element group; a current comparing means for outputting a HIGH current comparison result only when the first line current detection result, second line current detection result, and third line current detection result are all higher than the current control signal, and outputting a LOW current comparison result in all other cases; a timing signal generator for outputting a refresh timing signal; and a switching control signal generator to which said current comparison result and refresh timing signal are input for generating the switching control signal that sets the main circuit switching power elements of the main circuit power element group on or off. This current-controlled PWM inverter is configured such that the switching control signal generator determines the switching control signal controlling the on or off state of the main circuit switching power elements of the main circuit power element group at the refresh timing and at the timing at which the current comparison result changes from HIGH to LOW.

By means of this configuration, the current-controlled PWM inverter repeats a simple operation determining whether the first, second, third, fourth, fifth, and sixth main circuit switching power elements are on or off at the refresh timing and at the timing at which the current comparison result changes so that the difference between the current control signal and the line current detection result decreases. As a result, the line current of the three-phase motor approaches the current control signal and the current error can be decreased.

Furthermore, because the current-controlled PWM inverter of the present invention does not contain a current error amplifier, the problems associated with adjusting the gain of a current error amplifier are fundamentally eliminated, and there is absolutely no need for any gain adjustment.

The current-controlled PWM inverter also operates to continuously minimize current error even if the three-phase motor, current comparing means, or main circuit switching power element group characteristics and specifications change by design or as a result of manufacturing variations or temperature characteristics. The current control response characteristic is therefore also excellent, and there are no concerns about oscillation occurring.

Except for the current comparing means, the current control means in the current-controlled PWM inverter of the present invention can also be completely constructed from simple digital circuits. Such digital circuit components are also essentially free from offset and drift problems, and can be manufactured at low cost.

A current-controlled PWM inverter according to the third aspect of the invention comprises a motor current detection means for directly or indirectly detecting the line current inflowing from each line of a three-phase motor, and outputting a first line current detection result, a second line current detection result, and a third line current detection result; a current control signal for controlling the line current supplied from each line to the three-phase motor; a main circuit power element group comprising plural main circuit switching power elements in a three-phase bridge configuration comprising a current-circulating diode; a direct current primary power supply for supplying power to said power element group; a current comparing means for outputting a LOW current comparison result only when the absolute value of the first line current detection result, the absolute value of the second line current detection result, and the absolute value of the third line current detection result are all lower than the current control signal, and outputting a HIGH current comparison result in all other cases; a timing signal generator for outputting a refresh timing signal; and a switching control signal generator to which said current comparison result and refresh timing signal are input for generating the switching control signal that sets the main circuit switching power elements of the main circuit power element group on or off. This current-controlled PWM inverter is configured such that the switching control signal generator determines the switching control signal controlling the on or off state of the main circuit switching power elements of the main circuit power element group at the refresh timing and at the timing at which the current comparison result changes from LOW to HIGH.

By means of this configuration, the current-controlled PWM inverter repeats a simple operation determining whether the first, second, third, fourth, fifth, and sixth main circuit switching power elements are on or off at the refresh timing and at the timing at which the current comparison result changes so that the difference between the current control signal and the line current detection result decreases. As a result, the line current of the three-phase motor approaches the current control signal and the current error can be decreased.

Furthermore, because the current-controlled PWM inverter of the present invention does not contain a current error amplifier, the problems associated with adjusting the gain of a current error amplifier are fundamentally eliminated, and there is absolutely no need for any gain adjustment.

The current-controlled PWM inverter also operates to continuously minimize current error even if the three-phase motor, current comparing means, or main circuit switching power element group characteristics and specifications change by design or as a result of manufacturing variations or temperature characteristics. The current control response characteristic is therefore also excellent, and there are no concerns about oscillation occurring.

Moreover, the current comparing means in this embodiment of the invention compares the current control signal with the magnitude (absolute value) of the line current detection result even when the line current detection result is a negative value. As a result, it is possible to prevent any current exceeding the current value specified by the current control signal from flowing to the main circuit switching power elements even when the conduction angle expressed as an electrical angle is 120° or more.

Except for the current comparing means, the current control means in the current-controlled PWM inverter of the present invention can also be completely constructed from simple digital circuits. Such digital circuit components are also essentially free from offset and drift problems, and can be manufactured at low cost.

A current-controlled PWM inverter according to the fourth aspect of the invention is a current-controlled PWM inverter according to the first or third aspect described above, wherein the main circuit power element group comprising plural main circuit switching power elements in a three-phase bridge configuration comprising a current-circulating diode comprises a first main circuit switching power element connected to the positive terminal of the direct current primary power supply for supplying a first line current to the three-phase motor, a second main circuit switching power element connected to the positive terminal of the direct current primary power supply for supplying a second line current to the three-phase motor, a third main circuit switching power element connected to the positive terminal of the direct current primary power supply for supplying a third line current to the three-phase motor, a fourth main circuit switching power element connected to the negative terminal of the direct current primary power supply for supplying a first line current to the three-phase motor, a fifth main circuit switching power element connected to the negative terminal of the direct current primary power supply for supplying a second line current to the three-phase motor, a sixth main circuit switching power element connected to the negative terminal of the direct current primary power supply for supplying a third line current to the three-phase motor, and a current-circulating diode corresponding to each of the main circuit switching power elements. In this current-controlled PWM inverter, the switching control signal generator sets one of the first, second, and third main circuit switching power elements and one of the fourth, fifth, and sixth main circuit switching power elements on at the refresh timing, and at the timing at which the current comparison result changes from LOW to HIGH sets two of the first, second, and third main circuit switching power elements on, or two of the fourth, fifth, and sixth main circuit switching power elements on.

By means of this configuration, the current-controlled PWM inverter repeats a simple operation determining whether the first, second, third, fourth, fifth, and sixth main circuit switching power elements are on or off at the refresh timing and at the timing at which the current comparison result changes so that the difference between the current control signal and the line current detection result decreases. As a result, the line current of the three-phase motor approaches the current control signal and the current error can be decreased.

Furthermore, because the current-controlled PWM inverter of the present invention does not contain a current error amplifier, the problems associated with adjusting the gain of a current error amplifier are fundamentally eliminated, and there is absolutely no need for any gain adjustment.

The current-controlled PWM inverter also operates to continuously minimize current error even if the three-phase motor, current comparing means, or main circuit switching power element group characteristics and specifications change by design or as a result of manufacturing variations or temperature characteristics. The current control response characteristic is therefore also excellent, and there are no concerns about oscillation occurring.

Except for the current comparing means, the current control means in the current-controlled PWM inverter of the present invention can also be completely constructed from simple digital circuits. Such digital circuit components are also essentially free from offset and drift problems, and can be manufactured at low cost.

A current-controlled PWM inverter according to the fifth aspect of the invention is a current-controlled PWM inverter according to the first or third aspect described above, wherein the main circuit power element group comprising plural main circuit switching power elements in a three-phase bridge configuration comprising a current-circulating diode comprises a first main circuit switching power element connected to the positive terminal of the direct current primary power supply for supplying a first line current to the three-phase motor, a second main circuit switching power element connected to the positive terminal of the direct current primary power supply for supplying a second line current to the three-phase motor, a third main circuit switching power element connected to the positive terminal of the direct current primary power supply for supplying a third line current to the three-phase motor, a fourth main circuit switching power element connected to the negative terminal of the direct current primary power supply for supplying a. first line current to the three-phase motor, a fifth main circuit switching power element connected to the negative terminal of the direct current primary power supply for supplying a second line current to the three-phase motor, a sixth main circuit switching power element connected to the negative terminal of the direct current primary power supply for supplying a third line current to the three-phase motor, and a current-circulating diode corresponding to each of the main circuit switching power elements. In this current-controlled PWM inverter, the switching control signal generator sets one of the first, second, and third main circuit switching power elements and one of the fourth, fifth, and sixth main circuit switching power elements on at the refresh timing, and at the timing at which the current comparison result changes from LOW to HIGH sets only one of the first, second, and third main circuit switching power elements on, or only one of the fourth, fifth, and sixth main circuit switching power elements on.

By means of this configuration, the current-controlled PWM inverter repeats a simple operation determining whether the first, second, third, fourth, fifth, and sixth main circuit switching power elements are on or off at the refresh timing and at the timing at which the current comparison result changes so that the difference between the current control signal and the line current detection result decreases. As a result, the line current of the three-phase motor approaches the current control signal and the current error can be decreased.

Furthermore, because the current-controlled PWM inverter of the present invention does not contain a current error amplifier, the problems associated with adjusting the gain of a current error amplifier are fundamentally eliminated, and there is absolutely no need for any gain adjustment.

The current-controlled PWM inverter also operates to continuously minimize current error even if the three-phase motor, current comparing means, or main circuit switching power element group characteristics and specifications change by design or as a result of manufacturing variations or temperature characteristics. The current control response characteristic is therefore also excellent, and there are no concerns about oscillation occurring.

Except for the current comparing means, the current control means in the current-controlled PWM inverter of the present invention can also be completely constructed from simple digital circuits. Such digital circuit components are also essentially free from offset and drift problems, and can be manufactured at low cost.

A current-controlled PWM inverter according to the sixth aspect of the invention is a current-controlled PWM inverter according to the first or third aspect described above, wherein the main circuit power element group comprising plural main circuit switching power elements in a three-phase bridge configuration comprising a current-circulating diode comprises a first main circuit switching power element connected to the positive terminal of the direct current primary power supply for supplying a first line current to the three-phase motor, a second main circuit switching power element connected to the positive terminal of the direct current primary power supply for supplying a second line current to the three-phase motor, a third main circuit switching power element connected to the positive terminal of the direct current primary power supply for supplying a third line current to the three-phase motor, a fourth main circuit switching power element connected to the negative terminal of the direct current primary power supply for supplying a first line current to the three-phase motor, a fifth main circuit switching power element connected to the negative terminal of the direct current primary power supply for supplying a second line current to the three-phase motor, a sixth main circuit switching power element connected to the negative terminal of the direct current primary power supply for supplying a third line current to the three-phase motor, and a current-circulating diode corresponding to each of the main circuit switching power elements. In this current-controlled PWM inverter, the switching control signal generator sets one of the first, second, and third main circuit switching power elements and one of the fourth, fifth, and sixth main circuit switching power elements on at the refresh timing, and at the timing at which the current comparison result changes from LOW to HIGH sets the first, second, third, fourth, fifth, and sixth main circuit switching power elements off.

By means of this configuration, the current-controlled PWM inverter repeats a simple operation determining whether the first, second, third, fourth, fifth, and sixth main circuit switching power elements are on or off at the refresh timing and at the timing at which the current comparison result changes so that the difference between the current control signal and the line current detection result decreases. As a result, the line current of the three-phase motor approaches the current control signal and the current error can be decreased.

Furthermore, because the current-controlled PWM inverter of the present invention does not contain a current error amplifier, the problems associated with adjusting the gain of a current error amplifier are fundamentally eliminated, and there is absolutely no need for any gain adjustment.

The current-controlled PWM inverter also operates to continuously minimize current error even if the three-phase motor, current comparing means, or main circuit switching power element group characteristics and specifications change by design or as a result of manufacturing variations or temperature characteristics. The current control response characteristic is therefore also excellent, and there are no concerns about oscillation occurring.

Except for the current comparing means, the current control means in the current-controlled PWM inverter of the present invention can also be completely constructed from simple digital circuits. Such digital circuit components are also essentially free from offset and drift problems, and can be manufactured at low cost.

A current-controlled PWM inverter according to the seventh aspect of the invention is a current-controlled PWM inverter according to the second aspect wherein the main circuit power element group comprising plural main circuit switching power elements in a three-phase bridge configuration comprises a first main circuit switching power element connected to the positive terminal of the direct current primary power supply for supplying a first line current to the three-phase motor, a second main circuit switching power element connected to the positive terminal of the direct current primary power supply for supplying a second line current to the three-phase motor, a third main circuit switching power element connected to the positive terminal of the direct current primary power supply for supplying a third line current to the three-phase motor, a fourth main circuit switching power element connected to the negative terminal of the direct current primary power supply for supplying a first line current to the three-phase motor, a fifth main circuit switching power element connected to the negative terminal of the direct current primary power supply for supplying a second line current to the three-phase motor, a sixth main circuit switching power element connected to the negative terminal of the direct current primary power supply for supplying a third line current to the three-phase motor, and a current-circulating diode corresponding to each of the main circuit switching power elements. In this current-controlled PWM inverter, the switching control signal generator sets one of the first, second, and third main circuit switching power elements and one of the fourth, fifth, and sixth main circuit switching power elements on at the refresh timing, and at the timing at which the current comparison result changes from HIGH to LOW sets two of the first, second, and third main circuit switching power elements on, or two of the fourth, fifth, and sixth main circuit switching power elements on.

By means of this configuration, the current-controlled PWM inverter repeats a simple operation determining whether the first, second, third, fourth, fifth, and sixth main circuit switching power elements are on or off at the refresh timing and at the timing at which the current comparison result changes so that the difference between the current control signal and the line current detection result decreases. As a result, the line current of the three-phase motor approaches the current control signal and the current error can be decreased.

Furthermore, because the current-controlled PWM inverter of the present invention does not contain a current error amplifier, the problems associated with adjusting the gain of a current error amplifier are fundamentally eliminated, and there is absolutely no need for any gain adjustment.

The current-controlled PWM inverter also operates to continuously minimize current error even if the three-phase motor, current comparing means, or main circuit switching power element group characteristics and specifications change by design or as a result of manufacturing variations or temperature characteristics. The current control response characteristic is therefore also excellent, and there are no concerns about oscillation occurring.

Except for the current comparing means, the current control means in the current-controlled PWM inverter of the present invention can also be completely constructed from simple digital circuits. Such digital circuit components are also essentially free from offset and drift problems, and can be manufactured at low cost.

A current-controlled PWM inverter according to the eighth aspect of the invention is a current-controlled PWM inverter according to the second aspect wherein the main circuit power element group comprising plural main circuit switching power elements in a three-phase bridge configuration comprises a first main circuit switching power element connected to the positive terminal of the direct current primary power supply for supplying a first line current to the three-phase motor, a second main circuit switching power element connected to the positive terminal of the direct current primary power supply for supplying a second line current to the three-phase motor, a third main circuit switching power element connected to the positive terminal of the direct current primary power supply for supplying a third line current to the three-phase motor, a fourth main circuit switching power element connected to the negative terminal of the direct current primary power supply for supplying a first line current to the three-phase motor, a fifth main circuit switching power element connected to the negative terminal of the direct current primary power supply for supplying a second line current to the three-phase motor, a sixth main circuit switching power element connected to the negative terminal of the direct current primary power supply for supplying a third line current to the three-phase motor, and a current-circulating diode corresponding to each of the main circuit switching power elements. In this current-controlled PWM inverter, the switching control signal generator sets one of the first, second, and third main circuit switching power elements and one of the fourth, fifth, and sixth main circuit switching power elements on at the refresh timing, and at the timing at which the current comparison result changes from HIGH to LOW sets only one of the first, second, and third main circuit switching power elements on, or only one of the fourth, fifth, and sixth main circuit switching power elements on.

By means of this configuration, the current-controlled PWM inverter repeats a simple operation determining whether the first, second, third, fourth, fifth, and sixth main circuit switching power elements are on or off at the refresh timing and at the timing at which the current comparison result changes so that the difference between the current control signal and the line current detection result decreases. As a result, the line current of the three-phase motor approaches the current control signal and the current error can be decreased.

Furthermore, because the current-controlled PWM inverter of the present invention does not contain a current error amplifier, the problems associated with adjusting the gain of a current error amplifier are fundamentally eliminated, and there is absolutely no need for any gain adjustment.

The current-controlled PWM inverter also operates to continuously minimize current error even if the three-phase motor, current comparing means, or main circuit switching power element group characteristics and specifications change by design or as a result of manufacturing variations or temperature characteristics. The current control response characteristic is therefore also excellent, and there are no concerns about oscillation occurring.

Except for the current comparing means, the current control means in the current-controlled PWM inverter of the present invention can also be completely constructed from simple digital circuits. Such digital circuit components are also essentially free from offset and drift problems, and can be manufactured at low cost.

A current-controlled PWM inverter according to the ninth aspect of the invention is a current-controlled PWM inverter according to the second aspect wherein the main circuit power element group comprising plural main circuit switching power elements in a three-phase bridge configuration comprising a current-circulating diode comprises a first main circuit switching power element connected to the positive terminal of the direct current primary power supply for supplying a first line current to the three-phase motor, a second main circuit switching power element connected to the positive terminal of the direct current primary power supply for supplying a second line current to the three-phase motor, a third main circuit switching power element connected to the positive terminal of the direct current primary power supply for supplying a third line current to the three-phase motor, a fourth main circuit switching power element connected to the negative terminal of the direct current primary power supply for supplying a first line current to the three-phase motor, a fifth main circuit switching power element connected to the negative terminal of the direct current primary power supply for supplying a second line current to the three-phase motor, a sixth main circuit switching power element connected to the negative terminal of the direct current primary power supply for supplying a third line current to the three-phase motor, and a current-circulating diode corresponding to each of the main circuit switching power elements. In this current-controlled PWM inverter, the switching control signal generator sets one of the first, second, and third main circuit switching power elements and one of the fourth, fifth, and sixth main circuit switching power elements on at the refresh timing, and at the timing at which the current comparison result changes from HIGH to LOW sets the first, second, third, fourth, fifth, and sixth main circuit switching power elements off.

By means of this configuration, the current-controlled PWM inverter repeats a simple operation determining whether the first, second, third, fourth, fifth, and sixth main circuit switching power elements are on or off at the refresh timing and at the timing at which the current comparison result changes so that the difference between the current control signal and the line current detection result decreases. As a result, the line current of the three-phase motor approaches the current control signal and the current error can be decreased.

Furthermore, because the current-controlled PWM inverter of the present invention does not contain a current error amplifier, the problems associated with adjusting the gain of a current error amplifier are fundamentally eliminated, and there is absolutely no need for any gain adjustment.

The current-controlled PWM inverter also operates to continuously minimize current error even if the three-phase motor, current comparing means, or main circuit switching power element group characteristics and specifications change by design or as a result of manufacturing variations or temperature characteristics. The current control response characteristic is therefore also excellent, and there are no concerns about oscillation occurring.

Except for the current comparing means, the current control means in the current-controlled PWM inverter of the present invention can also be completely constructed from simple digital circuits. Such digital circuit components are also essentially free from offset and drift problems, and can be manufactured at low cost.

A current-controlled PWM inverter according to the tenth aspect of the invention is a current-controlled PWM inverter according to the third, fourth, fifth or sixth aspect wherein the current comparing means comprises a first sign inverting means for inverting the sign of the current control signal and outputting the resulting inverted-sign current control signal, a first comparator for comparing the first line current detection result with the current control signal, a second comparator for comparing the second line current detection result with the current control signal, a third comparator for comparing the third line current detection result with the current control signal, a fourth comparator for comparing the first line current detection result with the inverted-sign current control signal, a fifth comparator for comparing the second line current detection result with the inverted-sign current control signal, and a sixth comparator for comparing the third line current detection result with the inverted-sign current control signal. In this current-controlled PWM inverter, a logic operation is performed on the output results from the first, second, third, fourth, fifth, and sixth comparators to detect when the absolute values of the first, second, and third line current detection results are all less than the current control signal.

By means of this configuration, the current control signal is compared with the magnitude (absolute value) of the line current detection result even when the line current detection result is a negative value. As a result, it is possible to prevent a current exceeding the current value specified by the current control signal from flowing to the main circuit switching power elements even when the angle of conduction expressed as the electrical angle is 120° or more.

A current-controlled PWM inverter according to the eleventh aspect of the invention is a current-controlled PWM inverter according to the third fourth fifth sixth or tenth aspect wherein the current comparing means compares on a regular cycle whether the absolute values of the first, second, and third line current detection results are all less than the current control signal, and sets the current comparison result to HIGH only when said absolute values are not LOW for at least two consecutive cycles.

By means of this configuration it is possible to prevent false operation caused by noise contained in the line current detection results or current control signal, and the current-controlled PWM inverter can therefore operate to continuously minimize current error even when operating under conditions in which noise occurs easily.

A current-controlled PWM inverter according to the twelfth aspect of the invention is a current-controlled PWM inverter according to any of the above aspects, wherein the timing signal generator is configured to resynchronize at the commutation timing.

By means of this configuration variation in the voltage applied to each line of the motor does not occur, and the current-controlled PWM inverter thus operates to prevent current ripples and torque fluctuations in the motor.

BRIEF DESCRIPTION OF THE DRAWINGS

The present invention will become more fully understood from the detailed description given below and the accompanying diagrams wherein.

DESCRIPTION OF PREFERRED EMBODIMENTS

The preferred embodiments of the present invention are described below with reference to the accompanying figures.

The preferred embodiments of the present invention are described below with reference to FIG. 1 to FIG. 16.

Embodiment 1

The operation of a common current-controlled PWM inverter according to the first embodiment of the present invention is described below with reference to FIG. 6 using by way of example a brushless motor.

Figure 6:
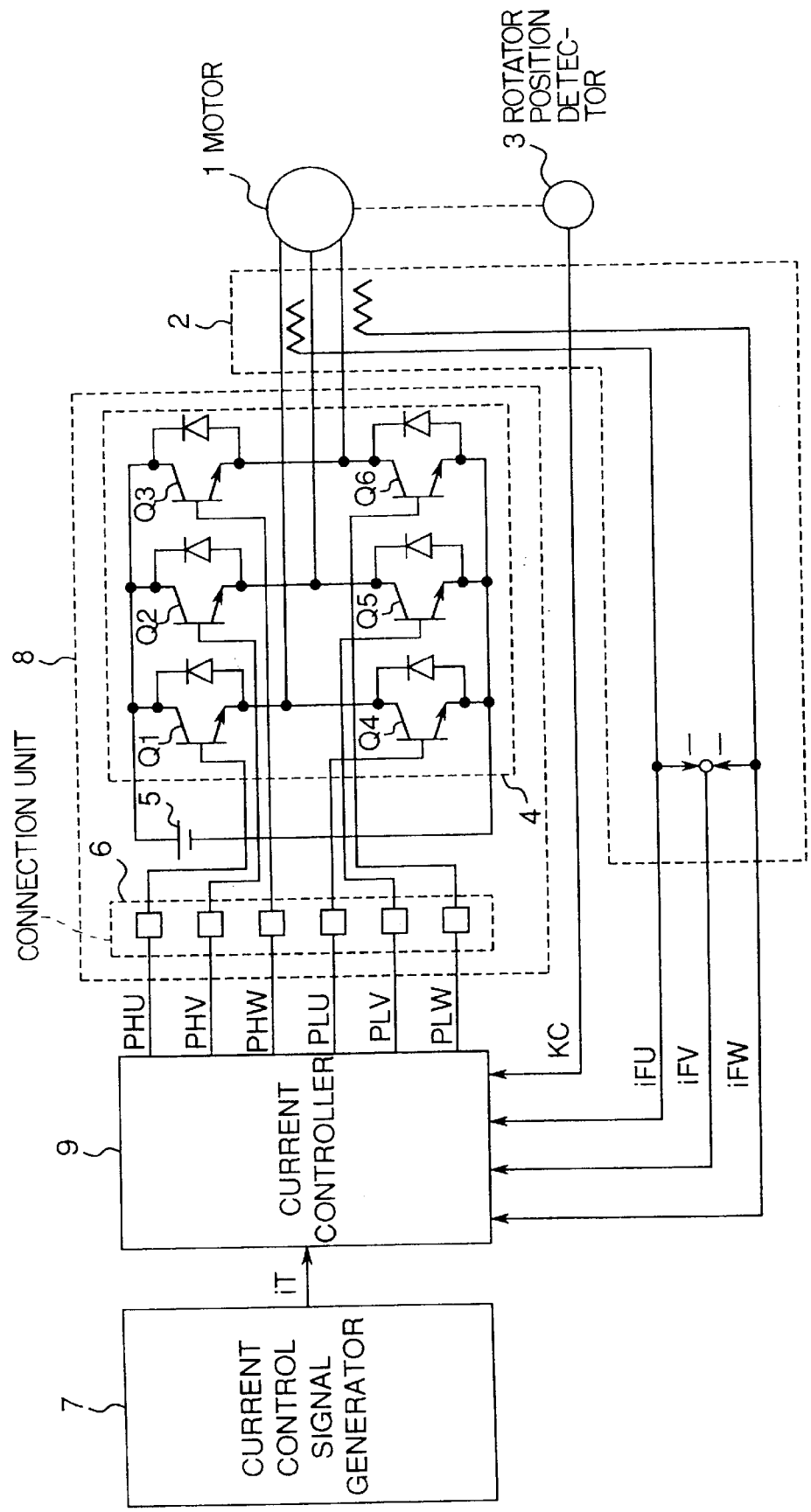
FIG. 6 is a block diagram of the current-controlled PWM inverter system according to a preferred embodiment of the invention.

As shown in FIG. 6, a current control signal iT specifying the current to be supplied to the motor 1 is output from current control signal generator 7.

The motor current detector 2 then detects two of the line currents supplied to the motor 1, obtains the remaining one line current by obtaining the sum of the two detected line currents and inverting the sign, and then outputs the results as the first line current detection result iFU, second line current detection result iFV, and third line current detection result iFW. Note that the motor current detector 2 may also directly detect the three line currents input to the motor 1 and output the results as the first line current detection result iFU, second line current detection result iFV, and third line current detection result iFW.

The rotator position detector 3 then detects the relative positions of the rotator and stator of the motor 1, and outputs the rotator position detection result KC.

The first line current detection result iFU, second line current detection result iFV, third line current detection result iFW, and rotator position detection result KC are supplied from the motor current detector 2 and rotator position detector 3 to the current controller 9. The current controller 9 then generates a first switching control signal PHU, a second switching control signal PHV, a third switching control signal PHW, a fourth switching control signal PLU, a fifth switching control signal PLV, and a sixth switching control signal PLW, which are transmitted from the current controller 9 to a main circuit power controller 8 via a connection unit 6.

The main circuit power controller 8 comprises a primary DC power supply 5 and a main circuit power element group 4 having a three-phase bridged configuration.

The main circuit power element group 4 specifically comprises a first main circuit switching power element Q1, which is connected to the positive terminal of the primary DC power supply 5 and supplies a first line current IU to the motor 1; a second main circuit switching power element Q2, which is connected to the positive terminal of the primary DC power supply 5 and supplies a second line current IV to the motor 1; a third main circuit switching power element Q3, which is connected to the positive terminal of the primary DC power supply 5 and supplies a third line current IW to the motor 1; a fourth main circuit switching power element Q4, which is connected to the negative terminal of the primary DC power supply 5 to supply the first line current IU to the motor 1; a fifth main circuit switching power element Q5, which is connected to the negative terminal of the primary DC power supply 5 to supply the second line current IV to the motor 1; a sixth main circuit switching power element Q6, which is connected to the negative terminal of the primary DC power supply 5 to supply the third line current IW to the motor 1; and a current-circulating diode connected parallel to each main circuit switching power element.

As a result, the main circuit power controller 8 switches the first main circuit switching power element Q1 on or off according to the first switching control signal PHU, switches the second main circuit switching power element Q2 on or off according to the second switching control signal PHV, switches the third main circuit switching power element Q3 on or off according to the third switching control signal PHW, switches the fourth main circuit switching power element Q4 on or off according to the fourth switching control signal PLU, switches the fifth main circuit switching power element Q5 on or off according to the fifth switching control signal PLV, and switches the sixth main circuit switching power element Q6 on or off according to the sixth switching control signal PLW.

Note that the main circuit power controller 8 as described herein is designed to switch the first main circuit switching power element Q1 on when the first switching control signal PHU becomes HIGH, and switch the first main circuit switching power element Q1 off when the first switching control signal PHU becomes LOW; switch the fourth main circuit switching power element Q4 on when the fourth switching control signal PLU is HIGH, and off when the fourth switching control signal PLU is LOW; switch the second main circuit switching power element Q2 on when the second switching control signal PHV is HIGH, and off when the second switching control signal PHV is LOW; switch the fifth main circuit switching power element Q5 on when the fifth switching control signal PLV is HIGH, and off when the fifth switching control signal PLV is LOW; switch the third main circuit switching power element Q3 on when the third switching control signal PHW is HIGH, and off when the third switching control signal PHW is LOW; and switch the sixth main circuit switching power element Q6 on when the sixth switching control signal PLW is HIGH, and off when the sixth switching control signal PLW is LOW.

The structure of the current controller 9 in the current-controlled PWM inverter thus comprised is described below with reference to the block diagram thereof in FIG. 1. The timing signal generator 10 outputs a refresh timing signal T1, the period of which may change as desired.

The current comparator 11 compares the current control signal iT, first line current detection result iFU, second line current detection result iFV, and third line current detection result iFW input thereto. If any one of the line current detection results iFU, iFV, or iFW is greater than the current control signal iT, the current comparator 11 outputs a HIGH current comparison result R1; the current comparison result R1 is otherwise LOW.

The switching control signal generator 12 then determines whether to switch each of the main circuit switching power elements on or off at the rise timing of the refresh timing signal T1 and at the timing at which the current comparison result changes from LOW to HIGH.

Figure 1:
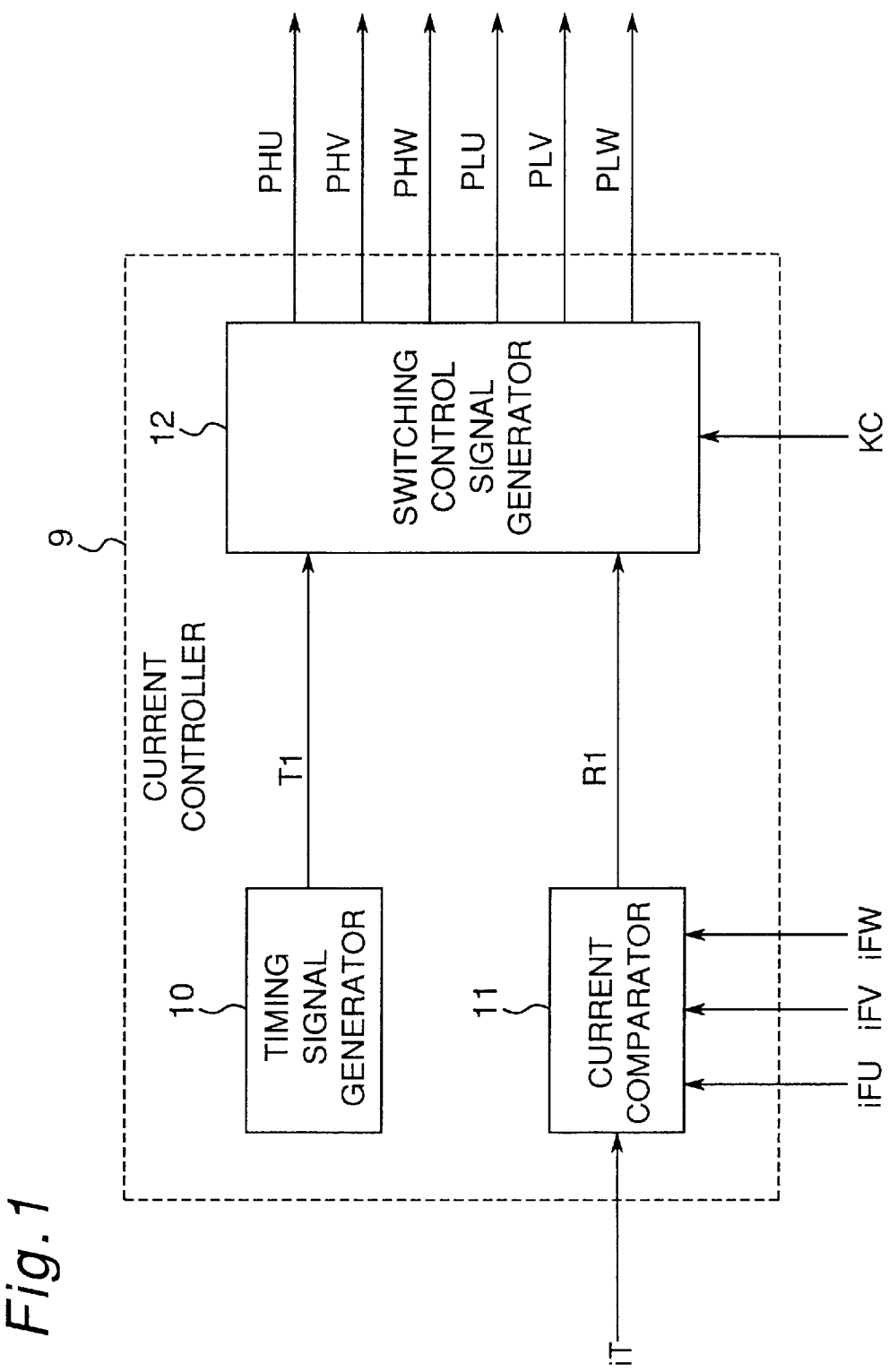
FIG. 1 is a block diagram of the current control means of the first embodiment of a current-controlled PWM inverter according to the present invention.

The operation and configuration of the switching control signal generator 12 in the current controller 9 shown in FIG. 1 is described below with reference to FIG. 2, a block diagram of the switching control signal generator 12.

Figure 2:
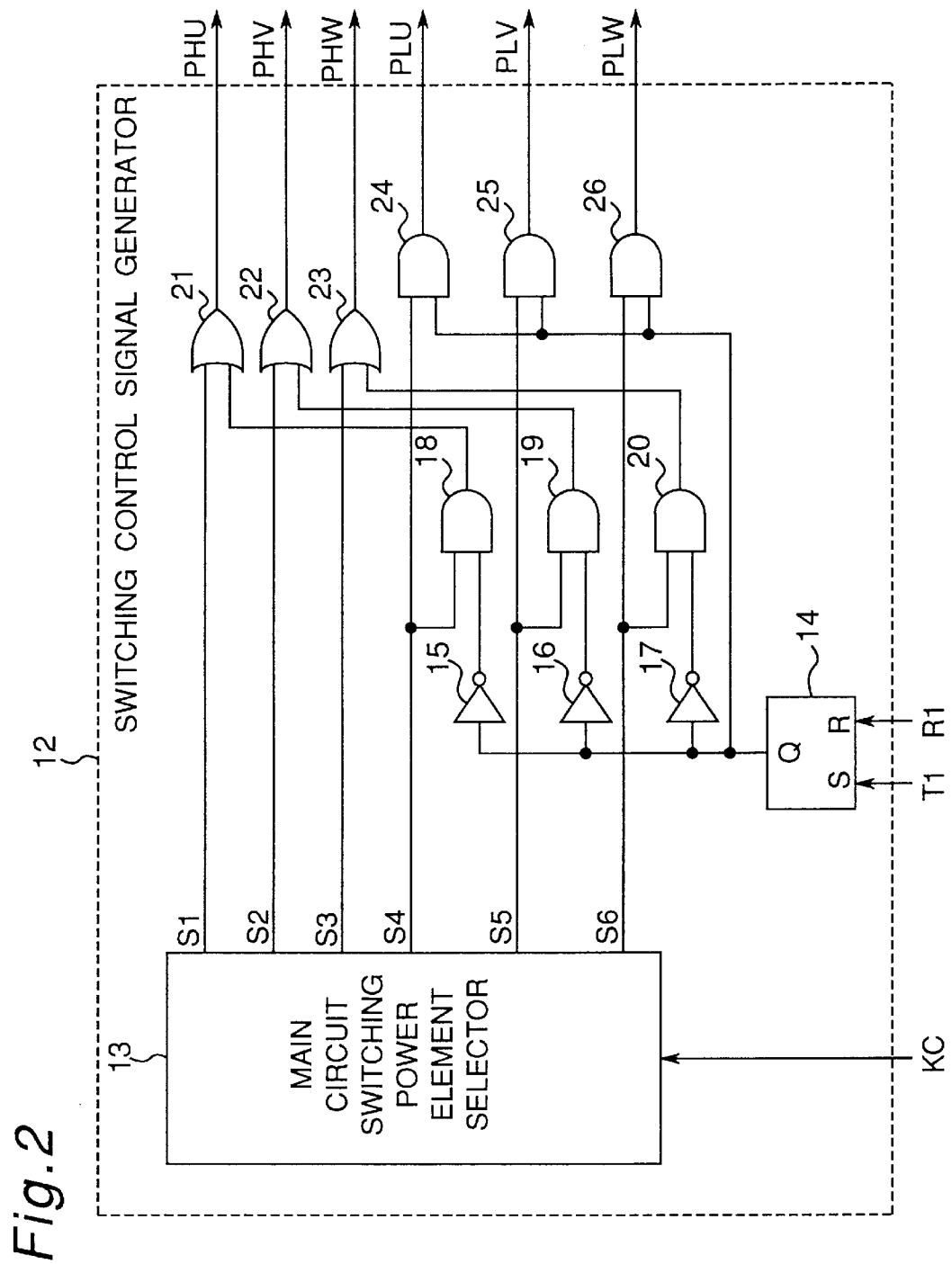
FIG. 2 is a block diagram of the switching control signal generator in the first embodiment of the invention.
Figure 22:
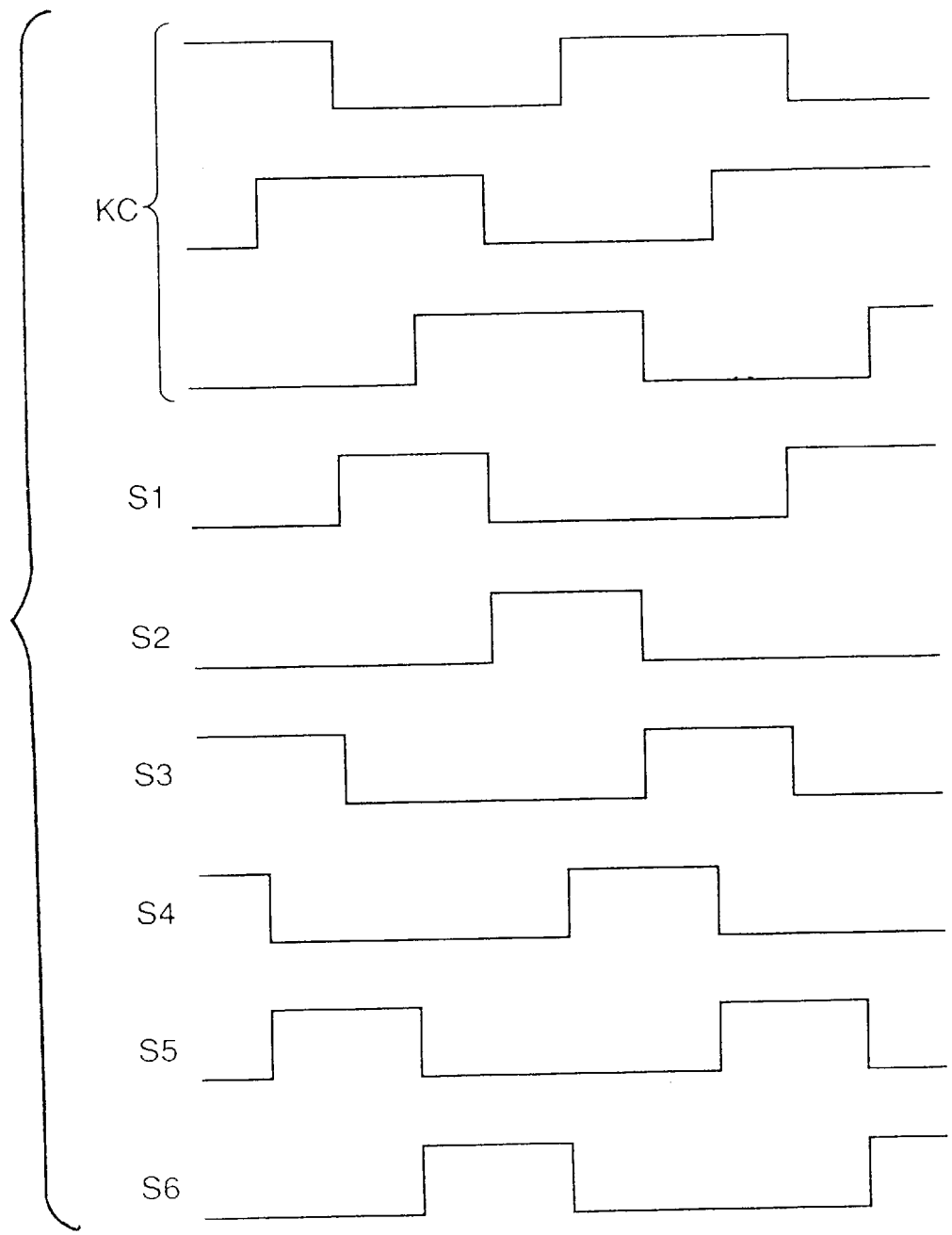
FIG. 22 is a timing chart of the selection signals.
Figure 23:
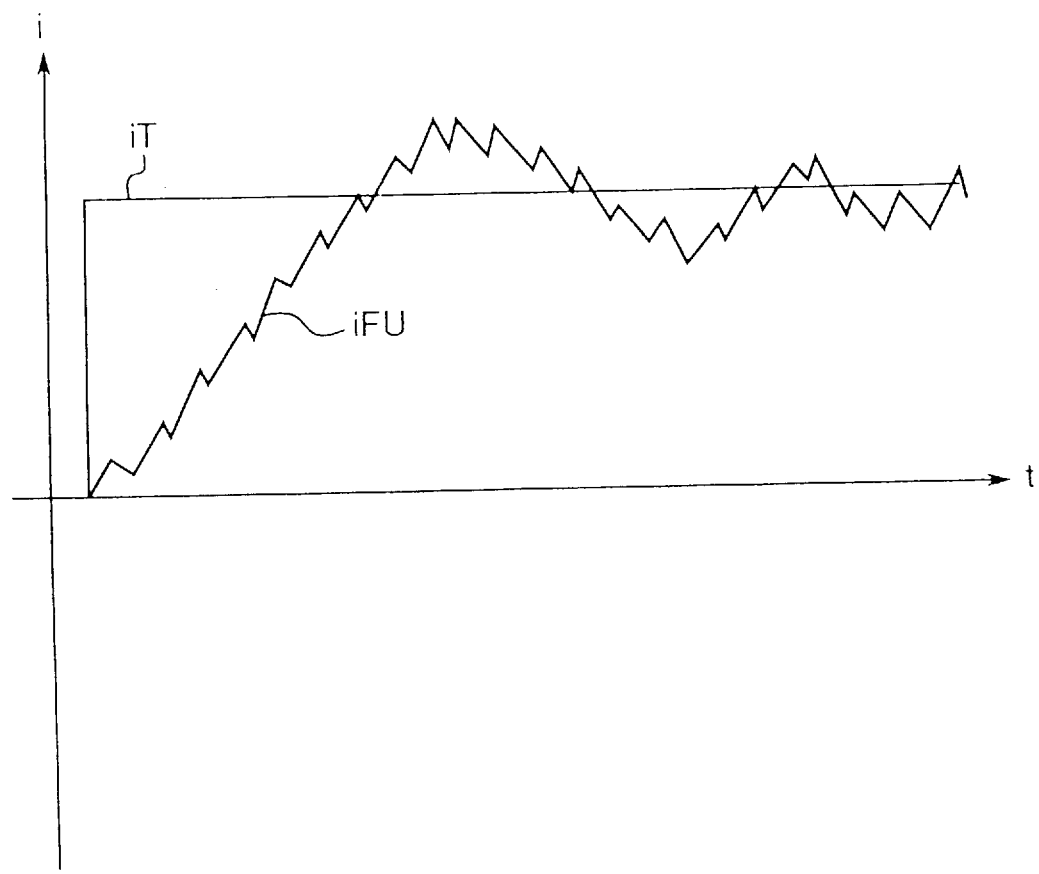
FIG. 23 is used to describe the operation of the conventional current control means shown in FIG. 19.

The main circuit switching power element selector 13 shown in FIG. 2 outputs the first, second, third, fourth, fifth, and sixth selection signals S1, S2, S3, S4, S5, and S6 based on the rotator position detection result KC as shown in FIG. 22. Note that while a 120°, 150°, or 180° conduction angle method measured in electrical degrees may be used to drive the motor, the main circuit switching power element selector 13 is described below using a 120° conduction angle method by way of example only.

The RS flip-flop 14 is a reset-priority RS flip-flop that is set at the rise timing of the refresh timing signal T1, and is reset at the timing at which the current comparison result R1 becomes HIGH. When the RS flip-flop 14 is set, it outputs HIGH, and when reset outputs LOW.

The first, second, and third logic inversion gates 15, 16, and 17 invert the output logic of the RS flip-flop 14. The first, second, and third AND gates 18, 19, and 20 perform an AND operation on the output from the corresponding first, second, and third logic inversion gates 15, 16, and 17 and the fourth, fifth, and sixth selection signals S4, S5, and S6, and output the AND result.

The first, second, and third OR gates 21, 22, and 23 perform an OR operation on the outputs from the corresponding first, second, and third AND gates 18, 19, and 20 and the first, second, and third selection signals S1, S2, and S3, and output the OR results as the first, second, and third switching control signals PHU, PHV, and PHW.

The fourth, fifth, and sixth AND gates 24, 25, and 26 perform an AND operation on the fourth, fifth, and sixth selection signals S4, S5, and S6 and the output from the RS flip-flop 14, and output the AND results as the fourth, fifth, and sixth switching control signals PLU, PLV, and PLW.

As a result, the switching control signal generator 12 thus comprised generates and outputs the first, second, third, fourth, fifth, and sixth switching control signals PHU, PHV, PHW, PLU, PLV, and PLW.

The operation of the switching control signal generator 12 is described in further detail below with reference to FIG. 2. It is assumed by way of example only below that the first and sixth selection signals S1 and S6 output from the main circuit switching power element selector 13 are HIGH, and the second, third, fourth, and fifth selection signals S2, S3, S4, and S5 are LOW.

If the current comparison result R1 is LOW at the rise timing of the refresh timing signal T1, the first RS flip-flop 14 is set at the T1 rise timing because the current comparison result R1 is low, and therefore outputs HIGH. As a result, the first, second, and third logic inversion gates 15, 16, and 17 output LOW, and the first, second, and third AND gates 18, 19, and 20 output low.

Because the first selection signal S1 is HIGH, only the first OR gate 21 outputs HIGH, i.e., outputs a HIGH first switching control signal PHU, and the second and third OR gates 22 and 23 output LOW switching control signals PHV and PHW.

Likewise because the sixth selection signal S6 is HIGH, only the sixth switching control signal PLW from the sixth AND gate 26 is HIGH, and the fourth and fifth switching control signals PLU and PLV are LOW.

As a result of this operation, the switching control signal generator 12 sets one of the first, second, and third switching control signals PHU, PHV, and PHW HIGH, and sets one of the fourth, fifth, and sixth switching control signals PLU, PLV, and PLW HIGH at the rise timing of the refresh timing signal T1.

The operation when the current comparison result R1 changes from LOW to HIGH is described next.

When the current comparison result R1 is HIGH, the reset-priority first RS flip-flop 14 is reset irrespective of the level of the refresh timing signal T1, and the RS flip-flop 14 outputs LOW. Because the third logic inversion gate 17 inverts the LOW input and supplies a HIGH to the third AND gate 20, the third AND gate 20 outputs HIGH to the third OR gate 23, which thus outputs a HIGH third switching control signal PHW. In addition, the LOW output from the RS flip-flop 14 causes the sixth AND gate 26 to output a LOW sixth switching control signal PLW.

As a result, the switching control signal generator 12 outputs each of the fourth, fifth, and sixth switching control signals PLU, PLV, and PLW LOW, and outputs two of the first, second, and third switching control signals PHU, PHV, and PHW HIGH when the current comparison result R1 changes from LOW to HIGH.

This output state is held until the rise of the next refresh timing signal T1. The same operation is then repeated at the rise of that next refresh timing signal T1. The same operation is also executed when selection signals S1 and S5, S2 and S4, S2 and S6, S3 and S4, or S3 and S5 are simultaneously selected.

As described above, when the current comparison result R1 is HIGH at the rise timing of the refresh timing signal T1, the reset-priority RS flip-flop 14 is reset irrespective of the level of the refresh timing signal T1 because the current comparison result R1 is HIGH and the RS flip-flop 14 therefore outputs LOW. Because the third logic inversion gate 17 outputs HIGH in this case, the third AND gate 20 also outputs HIGH to the third OR gate 23, which then outputs a HIGH third switching control signal PHW. Because the output from the RS flip-flop 14 is LOW, the sixth switching control signal PLW output from the switching control signal generator 12 is also LOW.

The structure of the current comparator 11 is described next with reference to FIG. 3.

The first, second, and third line current detection results iFU, iFV, and iFW are input to the first, second, and third absolute value calculators 47, 48, and 49, respectively, whereby the absolute values of the supplied signals are obtained and output as the first, second, and third absolute values. Note that these absolute value calculators can be achieved by means of the circuit configuration shown in FIG. 4.

The current control signal iT and the first, second, and third absolute values, respectively, are input to the seventh, eighth, and ninth comparators 50, 51, and 52, which output HIGH when the value of the current control signal iT is less than the supplied first, second, and third absolute values. These seventh, eighth, and ninth comparators 50, 51, and 52 output to an OR gate 53, which thus outputs a HIGH level signal as the current comparison result R1 when any one of the first, second, and third absolute values is greater than the current control signal iT.

Figure 3:
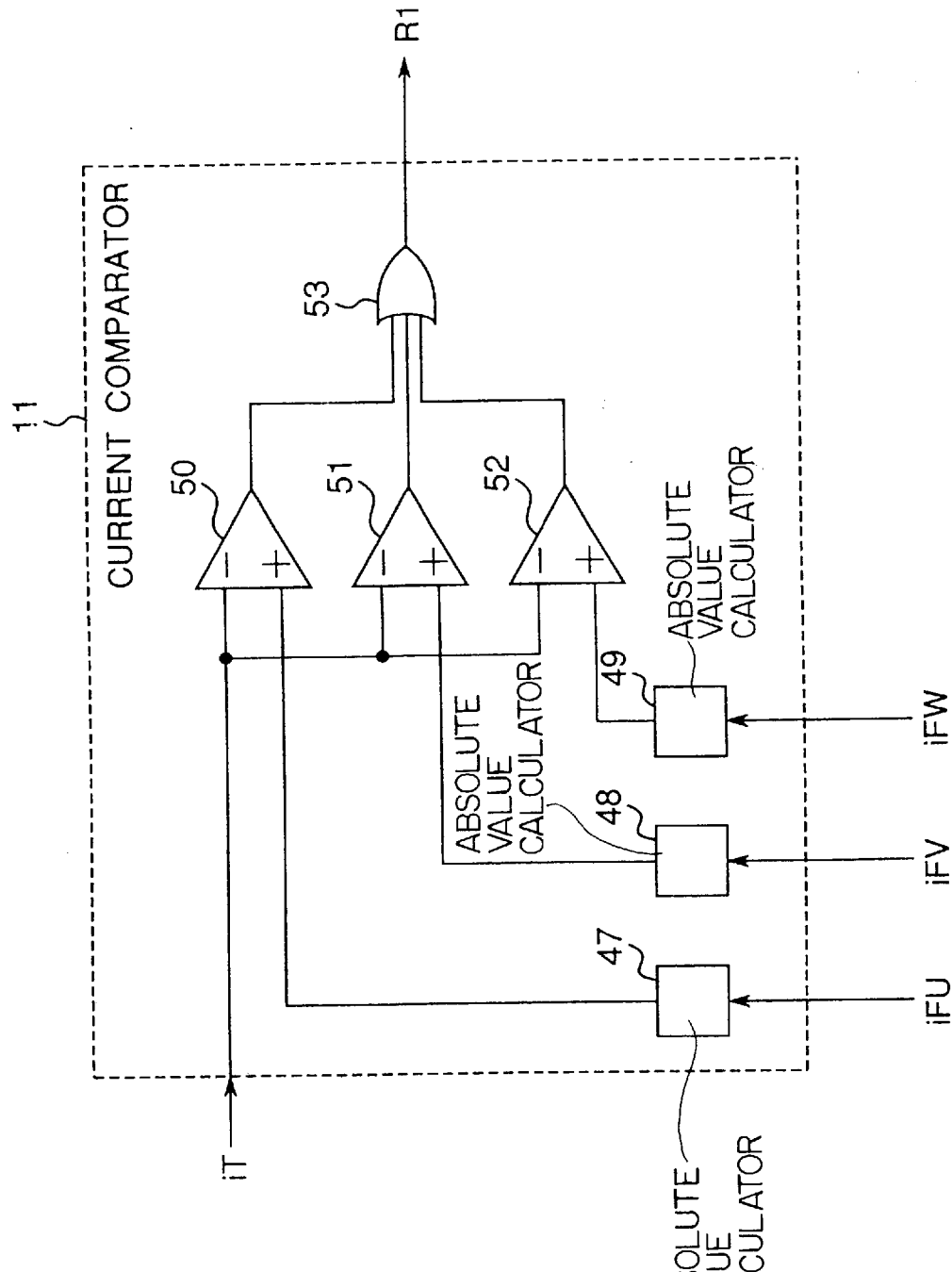
FIG. 3 is a block diagram of the current comparing means in the first embodiment of the invention.
Figure 4:
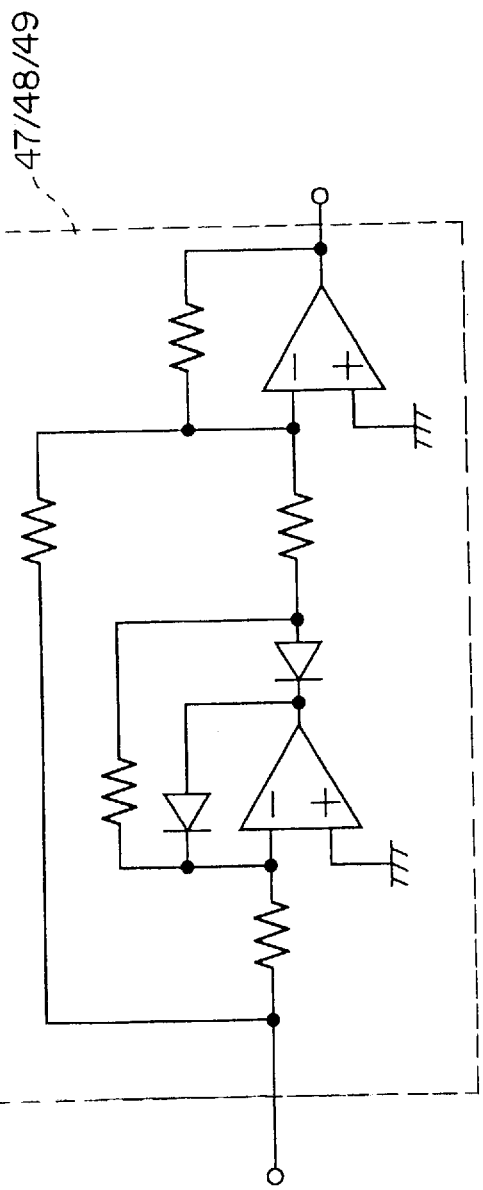
FIG. 4 is a block diagram of the absolute value calculators shown in FIG. 3.

The operation of the current comparator 11 shown in FIG. 3 is described in further detail below with reference to two cases, when the first, second, and third absolute values are all less than the current control signal iT, and when at least one of the first, second, and third absolute values is greater than the current control signal iT. The case in which the first, second, and third absolute values are all less than the current control signal iT is described first.

The seventh, eighth, and ninth comparators 50, 51, and 52 output LOW because the first, second, and third absolute values are all less than the current control signal iT. This causes the current comparison result R1 output from the second OR gate 53 to be LOW.

When at least one of the first, second, and third absolute values is greater than the current control signal iT, at least one of the seventh, eighth, and ninth comparators 50, 51, and 52 outputs HIGH. This causes the current comparison result R1 output from the second OR gate 53 to be HIGH.

Figure 5A:
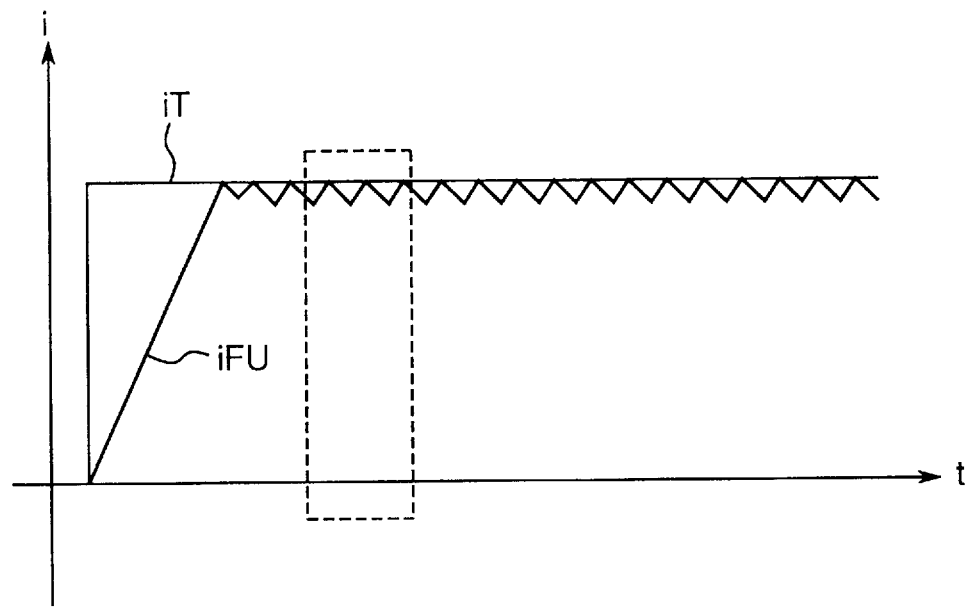
FIG. 5A and FIG. 5B are used to describe the operation of a preferred embodiment of the invention.
Figure 5B:
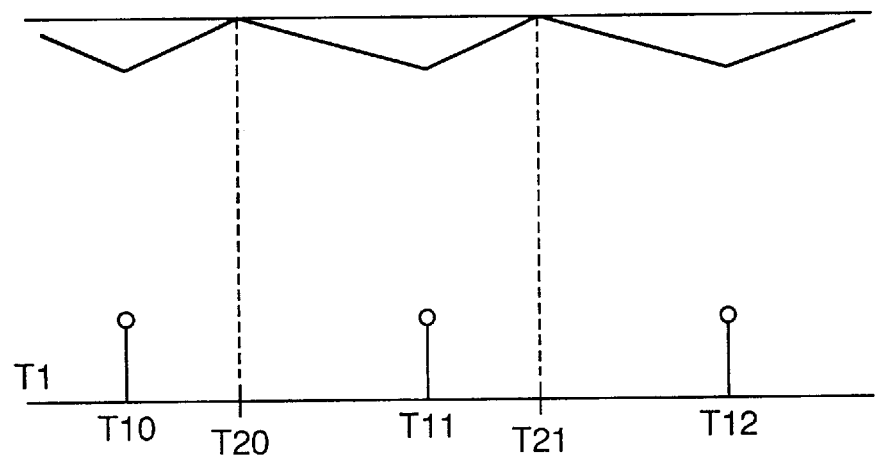

Actual control of the line current is described next with reference to FIG. 5. FIG. 5A is a graph of the current control signal and the first line current detection result, and FIG. 5B is an enlarged view of the area indicated by a dotted line in FIG. 5A. Note that the control situation shown in FIG. 5 occurs when the selection signals S1 and S6 output from the main circuit switching power element selector 13 are HIGH.

At time t=T10 the operation occurring at the rise of the refresh timing signal T1 is executed. More specifically, at time t=T10 the relationship between the current control signal iT and the absolute value of the first line current detection result iFU is iT>|iFU|, and the current comparison result R1 is LOW. The first switching control signal PHU and sixth switching control signal PLW output from the switching control signal generator 12 are therefore HIGH. As a result, the first main circuit switching power element Q1 and the sixth main circuit switching power element Q6 are on, and the first line current IU flows in the direction whereby the first line current detection result iFU approaches the current control signal iT.

The operation immediately after time t=T20 at which the absolute value of the first line current detection result iFU becomes equals to the current control signal iT is described next. In this case the relationship between the current control signal iT and the absolute value of the first line current detection result iFU is iT<|iFU| at time immediately after t=T20, and the current comparison result R1 is HIGH. The first switching control signal PHU and the third switching control signal PHW output from the switching control signal generator 12 are therefore HIGH, and PHV, PLU, PLV, and PLW are LOW. As a result, the first main circuit switching power element Q1 and the third main circuit switching power element Q3 are on. This results in an armature short, and the first line current detection result iFU therefore decreases by an electrical time constant.

This condition is held to the next rise of the refresh timing signal T1. Each line current to the motor 1 can thus be controlled by repeating this same operation after the rise timing of the next refresh timing signal T1. The same operation is also executed when selection signals S1 and S5, S2 and S4, S2 and S6, S3 and S4, or S3 and S5 are simultaneously selected by the main circuit switching power element selector 13.

The actual method of line current control has been described above.

It should be noted that the system shown in FIG. 6 comprises a rotator position detector 3 for detecting the position of the rotator of the motor 1, but it will be obvious that a sensorless system not comprising a rotator position detector 3 can also be built. It will also be obvious that by generating the rotator position detection result KC using an external oscillator and counter it is also possible to control the line current of induction motors, reactance motors, and synchronous motors.

It will also be obvious that when the main circuit switching power elements are MOS-FET devices, the current-circulating diode may be achieved with a MOS-FET parasitic diode.

Note, further, that the base drive circuit 6 for controlling the main circuit switching power elements Q1, Q2, Q3, Q4, Q5, and Q6 based on the output levels of the PHU, PHV, PHW, PLU, PLV, and PLW outputs from the current controller 9 in FIG. 6 may be constructed to wait for a delay of a known period before switching any of the main circuit switching power elements Q1, Q2, Q3, Q4, Q5, and Q6 from off to on, but to immediately switch said elements from on to off. When this control method is implemented and elements Q1 and Q4 are switched from on and off states to off and on states, respectively, element Q1 is switched off first and only after Q1 has been switched off is transistor Q4 switched on. The effect of this control sequence is to prevent the danger of an overcurrent flowing to the main circuit switching power elements as a result of Q1 and Q4 being momentarily on simultaneously at the state change timing.

It will also be obvious that to protect the current-controlled PWM inverter from overloads it is also possible to add to the six base drive means a state whereby all elements Q1, Q2, Q3, Q4, Q5, and Q6 can be turned off to cut off the current supply or when free-run operation of the motor is desirable.

Because the current-controlled PWM inverter of the present invention does thus not comprise a current error amplifier, the problems associated with the gain adjustment of a current error amplifier are fundamentally resolved as there is no need for any gain adjustment. Furthermore, even if the characteristics and specifications of the motor 1, motor current detector 2, current controller 9, or main circuit power controller 8 change by design or as a result of manufacturing variations or temperature characteristics, the current-controlled PWM inverter constantly operates to minimize current error. The current control response characteristic is therefore also excellent, and there are no concerns about oscillation occurring.

Note, further, that while the above embodiment has been described using a 120° conduction angle design for supplying drive current to the motor, it is also possible to use a 150° or 180° conduction angle method.

The current controller 9 of the current-controlled PWM inverter according to the present invention can, with the exception of the current comparator 11, be constructed using simple digital circuitry, and the digital circuit components are free of offset and drift, and are low-cost.

The current comparator 11 can also be comprised to output a LOW current comparison result only when the first line current detection result, second line current detection result, and third line current detection result are all less than the current control signal, and to output a HIGH current comparison result in all other cases. In this case the switching control signal generator determines whether to switch each of the main circuit switching power elements on or off at the rise timing of the refresh timing signal T1 and at the timing at which the current comparison result R1 changes from LOW to HIGH.

The current comparator 11 can also be comprised to output a HIGH current comparison result only when the first line current detection result, second line current detection result, and third line current detection result are all greater than the current control signal, and to output a LOW current comparison result in all other cases. In this case the switching control signal generator determines whether to switch each of the main circuit switching power elements on or off at the rise timing of the refresh timing signal T1 and at the timing at which the current comparison result R1 changes from HIGH to LOW.

By constructing the current comparator 11 as shown in FIG. 3, the magnitude (absolute value) of the line current detection result can be compared with the current control signal even when the line current detection result is negative. It is therefore also possible to prevent current exceeding a current value controlled by the current control signal from flowing to the main circuit switching power elements even when the conduction angle is greater than 120° (electrical angle).

The present invention can therefore supply a low cost current-controlled PWM inverter characterized by an excellent current control response characteristic without requiring gain or offset adjustment of the current error amplifier.

Embodiment 2

A current-controlled PWM inverter according to the second embodiment of the present invention is described next below with reference to the accompanying figures.

Figure 7:
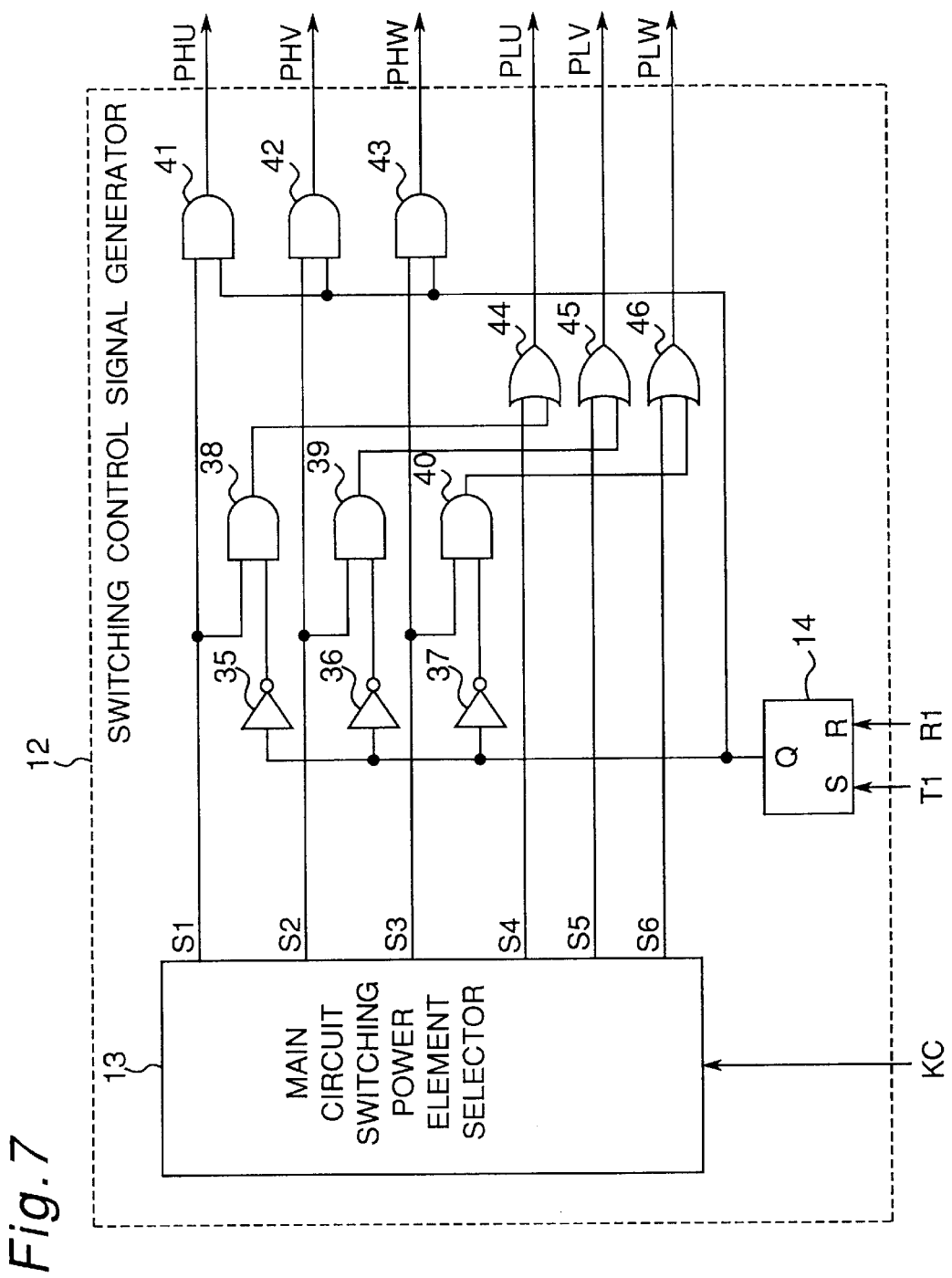
FIG. 7, FIG. 8, FIG. 9, and FIG. 10 are block diagrams of the switching control signal generator according to the second, third, fourth, and fifth embodiments of the present invention, respectively.

A current-controlled PWM inverter according to the second embodiment of the invention is substantially identical to that of the first embodiment shown in FIG. 1, and differs in the internal structure and operation of the switching control signal generator, which is shown in the block diagram of FIG. 7.

Because this second embodiment is identical to the first embodiment except for the internal structure of the switching control signal generator 12, further detailed description of the current controller 9 shown in FIG. 1 comprising the switching control signal generator 12 of the second embodiment, and the current-controlled PWM inverter shown in FIG. 6 comprising said current controller 9, is omitted below. Only the construction and operation of the switching control signal generator of the second embodiment is described below.

The structure of the switching control signal generator according to the second embodiment is described below with reference to FIG. 7, a block diagram of the switching control signal generator 12.

The main circuit switching power element selector 13 shown in FIG. 7 outputs the first, second, third, fourth, fifth, and sixth selection signals S1, S2, S3, S4, S5, and S6 based on the rotator position detection result KC as shown in FIG. 22. Note that while a 120°, 150°, or 180° conduction angle method measured in electrical degrees may be used to drive the motor, the main circuit switching power element selector 13 is described below using a 120° conduction angle method by way of example only.

The RS flip-flop 14 is a reset-priority RS flip-flop that is set at the rise timing of the refresh timing signal T1, and is reset at the timing at which the current comparison result R1 becomes HIGH. When the RS flip-flop 14 is set, it outputs HIGH, and when reset outputs LOW.

The fourth, fifth, and sixth logic inversion gates 35, 36, and 37 invert the output logic of the RS flip-flop 14. The seventh, eighth, and ninth AND gates 38, 39, and 40 perform an AND operation on the output from the corresponding fourth, fifth, and sixth logic inversion gates 35, 36, and 37 and selection signals S1, S2, and S3, and output the AND result.

The fourth, fifth, and sixth OR gates 44, 45, and 46 perform an OR operation on the fourth, fifth, and sixth selection signals S4, S5, and S6 and the output from the seventh, eighth, and ninth AND gates 38, 39, and 40, and output the OR results as switching control signals PLU, PLV, and PLW.

The tenth, eleventh, and twelfth AND gates 41, 42, and 43 similarly perform an AND on the first, second, and third selection signals S1, S2, and S3 and the output from the RS flip-flop 14, and output the AND results as the first, second, and third switching control signals PHU, PHV, and PHW.

The operation of the switching control signal generator thus comprised as shown in FIG. 7 is described below. It is assumed by way of example only below that the first and sixth selection signals S1 and S6 output from the main circuit switching power element selector 13 are HIGH, and the second, third, fourth, and fifth selection signals S2, S3, S4, and S5 are LOW.

If the current comparison result R1 is LOW at the rise timing of the refresh timing signal T1, the first RS flip-flop 14 is set at the T1 rise timing because the current comparison result R1 is low, and therefore outputs HIGH. As a result, the fourth, fifth, and sixth logic inversion gates 35, 36, and 37 output LOW, and the seventh, eighth, and ninth AND gates 38, 39, and 40 output low.

Because the sixth selection signal S6 is HIGH, only the sixth switching control signal PLW from the sixth AND gate 46 is HIGH, and the fourth and fifth switching control signals PLU and PLV from the fourth and fifth AND gates 44 and 45 are LOW.

Likewise because the first selection signal S1 is HIGH, only the tenth AND gate 41 outputs HIGH, i.e., outputs a HIGH first switching control signal PHU, and the eleventh and twelfth AND gates 42 and 43 output LOW switching control signals PHV and PHW.

As a result of this operation, the switching control signal generator 12 sets one of the first, second, and third switching control signals PHU, PHV, and PHW HIGH, and sets one of the fourth, fifth, and sixth switching control signals PLU, PLV, and PLW HIGH at the rise timing of the refresh timing signal T1.

The operation when the current comparison result R1 changes from LOW to HIGH is described next.

When the current comparison result R1 becomes HIGH, the reset-priority first RS flip-flop 14 is reset irrespective of the level of the refresh timing signal T1, and the RS flip-flop 14 outputs LOW. Because the fourth logic inversion gate 35 inverts the LOW input and supplies a HIGH to the seventh AND gate 38, the seventh AND gate 38 outputs HIGH to the fourth OR gate 44, which thus outputs a HIGH fourth switching control signal PLU. In addition, the LOW output from the RS flip-flop 14 also results in a LOW first switching control signal PHU.

As a result, the switching control signal generator 12 outputs each of the first, second, and third switching control signals PHU, PHV, and PHW LOW, and outputs two of the fourth, fifth, and sixth switching control signals PLU, PLV, and PLW HIGH when the current comparison result R1 changes from LOW to HIGH.

This output state is held until the rise of the next refresh timing signal T1. The same operation is then repeated at the rise of that next refresh timing signal T1. The same operation is also executed when selection signals S1 and S5, S2 and S4, S2 and S6, S3 and S4, or S3 and S5 are simultaneously selected.

As described above, when the current comparison result R1 is HIGH at the rise timing of the refresh timing signal T1, the reset-priority RS flip-flop 14 is reset irrespective of the level of the refresh timing signal T1 because the current comparison result R1 is HIGH and the RS flip-flop 14 therefore outputs LOW. Because the fourth logic inversion gate 35 outputs HIGH in this case, the seventh AND gate 38 also outputs HIGH to the fourth OR gate 44, which then outputs a HIGH fourth switching control signal PLU. Because the output from the RS flip-flop 14 is LOW, the first switching control signal PHU is also LOW.

Note, further, that while the above embodiment has been described using a 120° conduction angle design for supplying drive current to the motor, it is also possible to use a 150° or 180° conduction angle method.

The switching control signal generator 12 in the current controller 9 of a current-controlled PWM inverter according to the second embodiment of the present invention has been specifically described above. It should be noted, however, that the second embodiment specifically differs from the first embodiment in that the final result output of the switching control signal generator in the second embodiment is that two of the fourth, fifth, and sixth switching control signals PLU, PLV, and PLW are HIGH, whereas in the first embodiment two of the first, second, and third switching control signals PHU, PHV, and PHW are HIGH.

When two of the PHU, PHV, and PHW signals are HIGH, the line voltage of the two HIGH signals is zero, e.g., if PHU and PHV are HIGH, the U-phase and V-phase line voltages are 0 V. The line voltage of the two HIGH PLU, PLV, and PLW signals is likewise zero, e.g., if PLU and PLV are HIGH, the U-phase and V-phase line voltages are 0 V. Therefore, even if two of the PHU, PHV, and PHW signals are HIGH or two of the PLU, PLV, and PLW signals are HIGH, there is no change in the line voltage, and the current-controlled PWM inverter of the second embodiment can control the line current of the motor 1 with the same effect as line current control by the current-controlled PWM inverter of the first embodiment.

Embodiment 3

A current-controlled PWM inverter according to the third embodiment of the present invention is described next below with reference to the accompanying figures.

Figure 8:
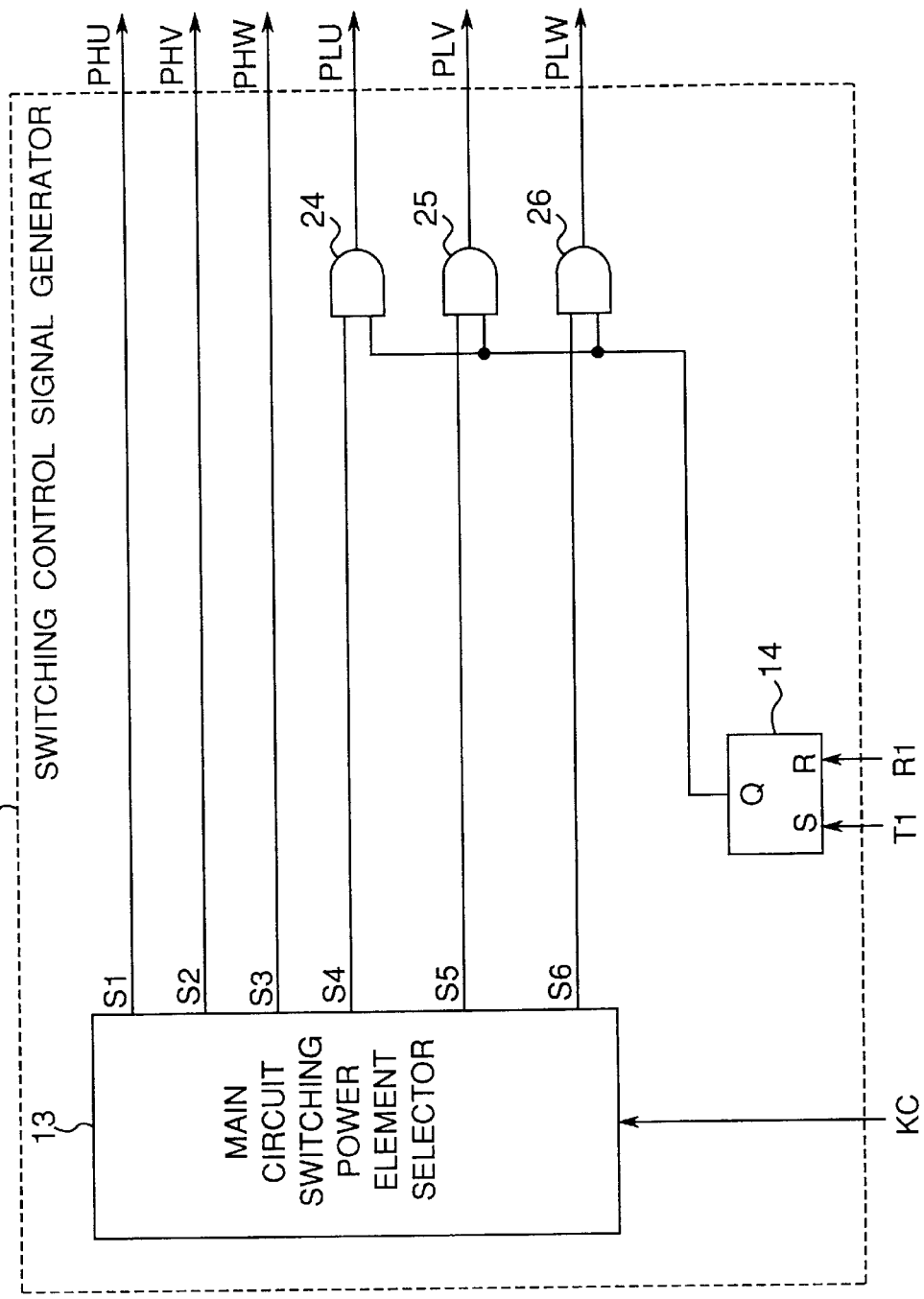

A current-controlled PWM inverter according to the third embodiment of the invention is substantially identical to that of the first embodiment shown in FIG. 1, and differs in the internal structure and operation of the switching control signal generator, which is shown in the block diagram of FIG. 8.

Because this third embodiment is identical to the first embodiment except for the internal structure of the switching control signal generator 12, further detailed description of the current controller 9 shown in FIG. 1 comprising the switching control signal generator 12 of the present embodiment, and the current-controlled PWM inverter shown in FIG. 6 comprising said current controller 9, is omitted below. Only the construction and operation of the switching control signal generator of the third embodiment is described below.

The structure of the switching control signal generator according to the third embodiment is described below with reference to FIG. 8, a block diagram of the switching control signal generator 12.

The main circuit switching power element selector 13 shown in FIG. 8 outputs the first, second, third, fourth, fifth, and sixth selection signals S1, S2, S3, S4, S5, and S6 based on the rotator position detection result KC as shown in FIG. 22. Note that while a 120°, 150°, or 180° conduction angle method measured in electrical degrees may be used to drive the motor, the main circuit switching power element selector 13 is described below using a 120° conduction angle method by way of example only.

The RS flip-flop 14 is a reset-priority RS flip-flop that is set at the rise timing of the refresh timing signal T1, and is reset at the timing at which the current comparison result R1 becomes HIGH. When the RS flip-flop 14 is set, it outputs HIGH, and when reset outputs LOW.

The fourth, fifth, and sixth AND gates 24, 25, and 26 perform an AND operation on the output from the RS flip-flop 14 and selection signals S1, S2, and S3, and output the fourth, fifth, and sixth switching control signals PLU, PLV, and PLW. Note that the switching control signal generator 12 directly outputs the first, second, and third selection signals as the first, second, and third switching control signals PHU, PHV, and PHW.

The operation of the switching control signal generator thus comprised as shown in FIG. 8 is described below. It is assumed by way of example only below that the first and sixth selection signals S1 and S6 output from the main circuit switching power element selector 13 are HIGH, and the second, third, fourth, and fifth selection signals S2, S3, S4, and S5 are LOW.

If the current comparison result R1 is LOW at the rise timing of the refresh timing signal T1, the first RS flip-flop 14 is set at the T1 rise timing because the current comparison result R1 is low, and therefore outputs HIGH. Because the sixth selection signal S6 is HIGH, only the sixth switching control signal PLW output by the sixth AND gate 26 is HIGH, and the PLU and PLV control signals are LOW. In addition, the HIGH first selection signal S1 results in a HIGH first switching control signal PHU and LOW second and third switching control signals PHV and PHW.

As a result of this operation, the switching control signal generator 12 sets one of the first, second, and third switching control signals PHU, PHV, and PHW HIGH, and sets one of the fourth, fifth, and sixth switching control signals PLU, PLV, and PLW HIGH at the rise timing of the refresh timing signal T1.

The operation when the current comparison result R1 changes from LOW to HIGH is described next.

When the current comparison result R1 becomes HIGH, the reset-priority first RS flip-flop 14 is reset irrespective of the level of the refresh timing signal T1, and the RS flip-flop 14 outputs LOW. Because the RS flip-flop 14 outputs LOW, the sixth switching control signal PLW is also LOW.

As a result, the switching control signal generator 12 outputs as a HIGH signal the first, second, or third switching control signal PHU, PHV, or PHW that was HIGH at the rise timing of the refresh timing signal T1 when the current comparison result R1 changed from LOW to HIGH, and outputs all of the fourth, fifth, and sixth switching control signals PLU, PLV, and PLW LOW.

This output state is held until the rise of the next refresh timing signal T1. The same operation is then repeated at the rise of that next refresh timing signal T1. The same operation is also executed when selection signals S1 and S5, S2 and S4, S2 and S6, S3 and S4, or S3 and S5 are simultaneously selected.

As described above, when the current comparison result R1 is HIGH at the rise timing of the refresh timing signal T1, the reset-priority RS flip-flop 14 is reset irrespective of the level of the refresh timing signal T1 because the current comparison result R1 is HIGH and the RS flip-flop 14 therefore outputs LOW. Because the output from the RS flip-flop 14 is LOW, the sixth switching control signal PLW is LOW and only the first switching control signal PHU is HIGH.

Note, further, that while the above embodiment has been described using a 120° conduction angle design for supplying drive current to the motor, it is also possible to use a 150° or 180° conduction angle method.

The switching control signal generator 12 in the current controller 9 of a current-controlled PWM inverter according to the third embodiment of the present invention has been specifically described above. It should be noted, however, that the third embodiment specifically differs from the first embodiment in that the final result output of the switching control signal generator in the third embodiment is that only one of the first, second, and third switching control signals PHU, PHV, and PHW is HIGH, whereas in the first embodiment two of the first, second, and third switching control signals PHU, PHV, and PHW are HIGH.

When two of the PHU, PHV, and PHW signals are HIGH, the line voltage of the two HIGH signals is zero, e.g., if PHU and PHV are HIGH, the U-phase and V-phase line voltages are 0 V. The line voltage between the two phase lines when one of the PHU, PHV, and PHW signals is HIGH is the forward voltage of the current-circulating diode. For example, if PHU and PLW are HIGH, but PLW then becomes LOW, the line voltage between the U-phase and the W-phase is the forward voltage of the current-circulating diode. This is because until PLW becomes LOW, current flows through the sixth main circuit switching power element Q6 to the negative terminal of the primary DC power supply 5, and the flowing current cannot be immediately cut off even if the sixth main circuit switching power element Q6 is turned off because of the normal inductance of the motor 1. Current therefore flows through the current-circulating diode to the positive terminal of the primary DC power supply 5, and the forward voltage of the current-circulating diode thus becomes the line voltage. Therefore, whether two of the PHU, PHV, and PHW signals are HIGH or one of the PHU, PHV, and PHW signals is HIGH, there is no change in the line voltage, and the current-controlled PWM inverter of the third embodiment can control the line current of the motor 1 with the same effect as line current control by the current-controlled PWM inverter of the first embodiment.

Embodiment 4

A current-controlled PWM inverter according to the fourth embodiment of the present invention is described next below with reference to the accompanying figures.

Figure 9:
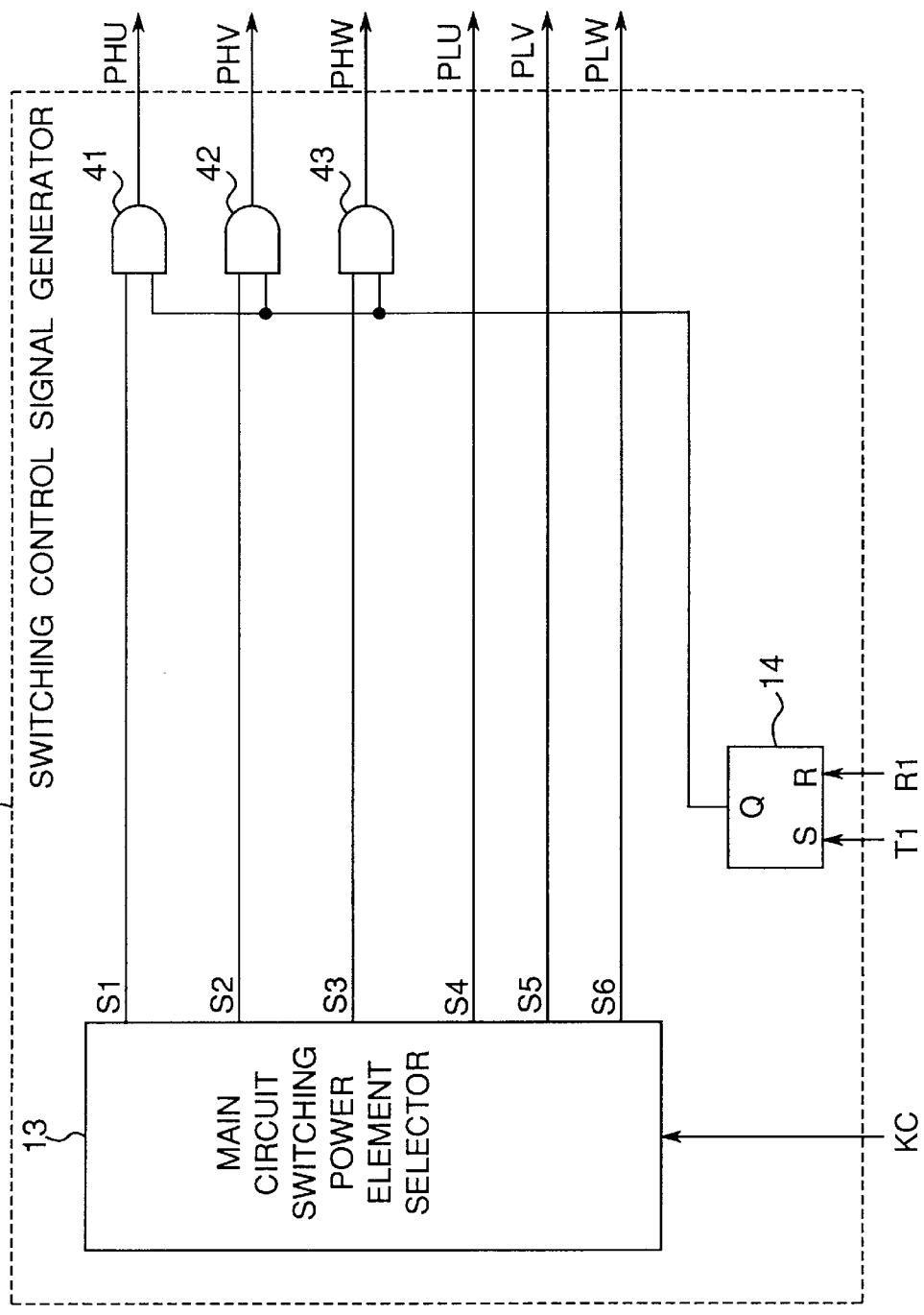

A current-controlled PWM inverter according to the fourth embodiment of the invention is substantially identical to that of the first embodiment shown in FIG. 1, and differs in the internal structure and operation of the switching control signal generator, which is shown in the block diagram of FIG. 9.

Because this fourth embodiment is identical to the first embodiment except for the internal structure of the switching control signal generator 12, further detailed description of the current controller 9 shown in FIG. 1 comprising the switching control signal generator 12 of the present embodiment, and the current-controlled PWM inverter shown in FIG. 6 comprising said current controller 9, is omitted below. Only the construction and operation of the switching control signal generator of the fourth embodiment is described below.

The structure of the switching control signal generator according to the fourth embodiment is described below with reference to FIG. 9, a block diagram of the switching control signal generator 12.

The main circuit switching power element selector 13 shown in FIG. 9 outputs the first, second, third, fourth, fifth, and sixth selection signals S1, S2, S3, S4, S5, and S6 based on the rotator position detection result KC as shown in FIG. 22. Note that while a 120°, 150°, or 180° conduction angle method measured in electrical degrees may be used to drive the motor, the main circuit switching power element selector 13 is described below using a 1200 conduction angle method by way of example only.

The RS flip-flop 14 is a reset-priority RS flip-flop that is set at the rise timing of the refresh timing signal T1, and is reset at the timing at which the current comparison result R1 becomes HIGH. When the RS flip-flop 14 is set, it outputs HIGH, and when reset outputs LOW.

The tenth, eleventh, and twelfth AND gates 41, 42, and 43 perform an AND on the first, second, and third selection signals S1, S2, and S3 and the output from the RS flip-flop 14, and output the AND results as the first, second, and third switching control signals PHU, PHV, and PHW. Note that the switching control signal generator 12 directly outputs the fourth, fifth, and sixth selection signals as the fourth, fifth, and sixth switching control signals PLU, PLV, and PLW.

The operation of the switching control signal generator thus comprised as shown in FIG. 9 is described below. It is assumed by way of example only below that the first and sixth selection signals S1 and S6 output from the main circuit switching power element selector 13 are HIGH, and the second, third, fourth, and fifth selection signals S2, S3, S4, and S5 are LOW.

If the current comparison result R1 is LOW at the rise timing of the refresh timing signal T1, the first RS flip-flop 14 is set at the T1 rise timing because the current comparison result R1 is low, and therefore outputs HIGH. Because the first selection signal S1. is HIGH and the RS flip-flop 14 outputs HIGH, the first switching control signal PHU output from the tenth AND gate 41 is HIGH, and the second and third switching control signals PHV and PHW output from AND gates 42 and 43 are LOW. Because the sixth selection signal S6 is also HIGH, the sixth switching control signal PLW is HIGH, and the PLU and PLV control signals are LOW.

As a result of this operation, the switching control signal generator 12 sets one of the first, second, and third switching control signals PHU, PHV, and PHW HIGH, and sets one of the fourth, fifth, and sixth switching control signals PLU, PLV, and PLW LOW at the rise timing of the refresh timing signal T1.

The operation when the current comparison result R1 changes from LOW to HIGH is described next.

When the current comparison result R1 becomes HIGH, the reset-priority first RS flip-flop 14 is reset irrespective of the level of the refresh timing signal T1, and the RS flip-flop 14 outputs LOW. Because the RS flip-flop 14 outputs LOW, the first switching control signal PHU is also LOW.

As a result, the switching control signal generator 12 outputs as a HIGH signal the fourth, fifth, or sixth switching control signal PLU, PLV, or PLW that was HIGH at the rise timing of the refresh timing signal T1 when the current comparison result R1 changed from LOW to HIGH, and outputs all of the first, second, and third switching control signals PHU, PHV, and PHW LOW.

This output state is held until the rise of the next refresh timing signal T1. The same operation is then repeated at the rise of that next refresh timing signal T1. The same operation is also executed when selection signals S1 and S5, S2 and S4, S2 and S6, S3 and S4, or S3 and S5 are simultaneously selected.

As described above, when the current comparison result R1 is HIGH at the rise timing of the refresh timing signal T1, the reset-priority RS flip-flop 14 is reset irrespective of the level of the refresh timing signal T1 because the current comparison result R1 is HIGH and the RS flip-flop 14 therefore outputs LOW. Because the output from the RS flip-flop 14 is LOW, the first switching control signal PHU is LOW and only the sixth switching control signal PLW is HIGH.

Note, further, that while the above embodiment has been described using a 120° conduction angle design for supplying drive current to the motor, it is also possible to use a 150° or 180° conduction angle method.

The switching control signal generator 12 in the current controller 9 of a current-controlled PWM inverter according to the fourth embodiment of the present invention has been specifically described above. It should be noted, however, that the fourth embodiment specifically differs from the first embodiment in that the final result output of the switching control signal generator in the fourth embodiment is that only one of the fourth, fifth, and sixth switching control signals PLU, PLV, and PLW is HIGH, whereas in the first embodiment two of the first, second, and third switching control signals PHU, PHV, and PHW are HIGH.

When two of the PHU, PHV, and PHW signals are HIGH, the line voltage of the two HIGH signals is zero, e.g., if PHU and PHV are HIGH, the U-phase and V-phase line voltages are 0 V. The line voltage between the two phase lines when one of the PLU, PLV, and PLW signals is HIGH is the forward voltage of the current-circulating diode. For example, if PHU and PLW are HIGH and PHU then becomes LOW, the line voltage between the U-phase and the W-phase is the forward voltage of the current-circulating diode. This is because until PHU becomes LOW, current flows through the first main circuit switching power element Q1 to the positive terminal of the primary DC power supply 5, and the flowing current cannot be immediately cut off even if the first main circuit switching power element Q1 is turned off because of the normal inductance of the motor 1. Current therefore flows through the current-circulating diode to the negative terminal of the primary DC power supply 5, and the forward voltage of the current-circulating diode thus becomes the line voltage. Therefore, whether two of the PHU, PHV, and PHW signals are HIGH or one of the PLU, PLV, and PLW signals is HIGH, there is no change in the line voltage, and the current-controlled PWM inverter of the fourth embodiment can control the line current of the motor 1 with the same effect as line current control by the current-controlled PWM inverter of the first embodiment.

Embodiment 5

A current-controlled PWM inverter according to the fifth embodiment of the present invention is described next below with reference to the accompanying figures.

Figure 10:
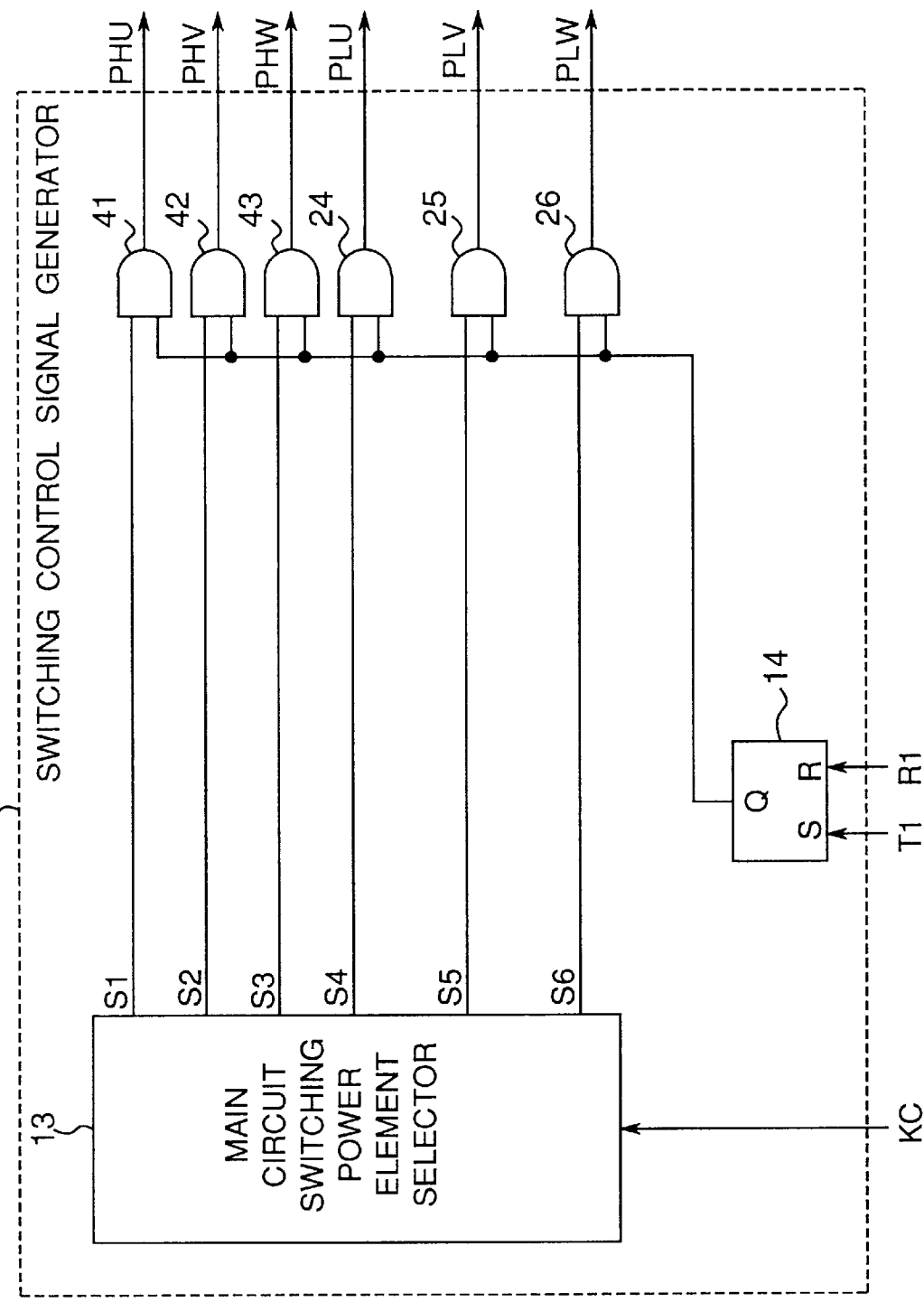
Figure 11:
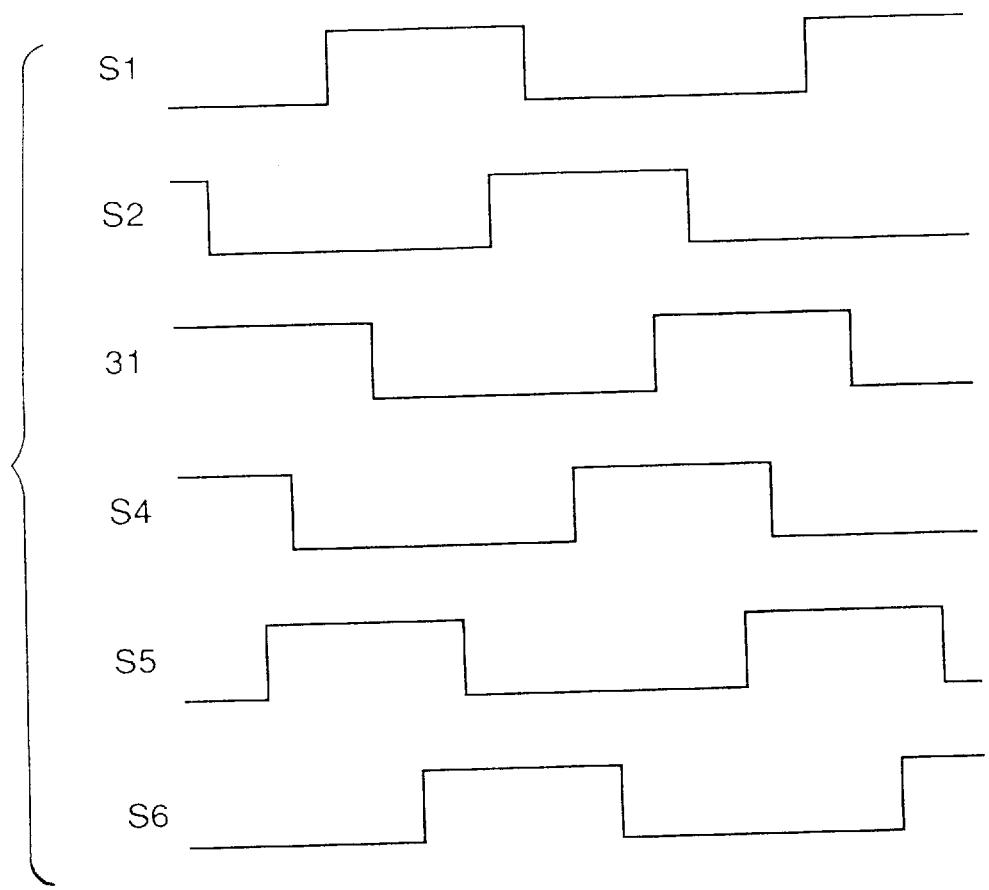
FIG. 11 is a timing chart of the selection signals in a 150° conduction angle system.

A current-controlled PWM inverter according to the fifth embodiment of the invention is substantially identical to that of the first embodiment shown in FIG. 1, and differs in the internal structure and operation of the switching control signal generator, which is shown in the block diagram of FIG. 10.

Because this fifth embodiment is identical to the first embodiment except for the internal structure of the switching control signal generator 12, further detailed description of the current controller 9 shown in FIG. 1 comprising the switching control signal generator 12 of the present embodiment, and the current-controlled PWM inverter shown in FIG. 6 comprising said current controller 9, is omitted below. Only the construction and operation of the switching control signal generator of the fifth embodiment is described below.

The structure of the switching control signal generator according to the fifth embodiment is described below with reference to FIG. 10, a block diagram of the switching control signal generator 12.

The main circuit switching power element selector 13 shown in FIG. 10 outputs the first, second, third, fourth, fifth, and sixth selection signals S1, S2, S3, S4, S5, and S6 based on the rotator position detection result KC as shown in FIG. 22. Note that while a 120°, 150°, or 180° conduction angle method measured in electrical degrees may be used to drive the motor, the main circuit switching power element selector 13 is described below using a 120° conduction angle method by way of example only.

The RS flip-flop 14 is a reset-priority RS flip-flop that is set at the rise timing of the refresh timing signal T1, and is reset at the timing at which the current comparison result R1 becomes HIGH. When the RS flip-flop 14 is set, it outputs HIGH, and when reset outputs LOW.

The tenth, eleventh, and twelfth AND gates 41, 42, and 43 perform an AND on the first, second, and third selection signals S1, S2, and S3 and the output from the RS flip-flop 14, and output the AND results as the first, second, and third switching control signals PHU, PHV, and PHW.

The fourth, fifth, and sixth AND gates 24, 25, and 26 perform an AND operation on the output from the RS flip-flop 14 and selection signals S1, S2, and S3, and output the fourth, fifth, and sixth switching control signals PLU, PLV, and PLW.

The operation of the switching control signal generator thus comprised as shown in FIG. 10 is described below. It is assumed by way of example only below that the first, second, and sixth selection signals S1, S2, and S6 output from the main circuit switching power element selector 13 are HIGH, and the third, fourth, and fifth selection signals S3, S4, and S5 are LOW.

If the current comparison result R1 is LOW at the rise timing of the refresh timing signal T1, the first RS flip-flop 14 is set at the T1 rise timing because the current comparison result R1 is low, and therefore outputs HIGH. Because the first and second selection signals S1 and S2 are HIGH and the RS flip-flop 14 outputs HIGH, the first and second switching control signals PHU and PHV output from AND gates 41 and 42 are HIGH, and the third switching control signal PHW output from AND gate 43 is LOW. Because the sixth selection signal S6 is also HIGH, the sixth switching control signal PLW from sixth AND gate 26 is HIGH, and the fourth and fifth switching control signals PLU and PLV from AND gates 24 and 25 are LOW.

The operation when the current comparison result R1 changes from LOW to HIGH is described next.

When the current comparison result R1 becomes HIGH, the reset-priority first RS flip-flop 14 is reset irrespective of the level of the refresh timing signal T1, and the RS flip-flop 14 outputs LOW. Because the RS flip-flop 14 outputs LOW, switching control signals PHU, PHV, and PLW are LOW.

As a result, the switching control signal generator 12 outputs as LOW signals all of the switching control signals PHU, PHV, PHW, PLU, PLV, and PLW.

This output state is held until the rise of the next refresh timing signal T1. The same operation is then repeated at the rise of that next refresh timing signal T1. The same operation is also executed using any combination of selection signals S1, S2, S3, S4, S5 and S6 shown in FIG. 11.

As described above, when the current comparison result R1 is HIGH at the rise timing of the refresh timing signal T1, the reset-priority RS flip-flop 14 is reset irrespective of the level of the refresh timing signal T1 because the current comparison result R1 is HIGH and the RS flip-flop 14 therefore outputs LOW. Because the output from the RS flip-flop 14 is LOW, all of the switching control signals PHU, PHV, PHW, PLU, PLV, and PLW are also LOW.

Note, further, that while the above embodiment has been described using a 120° conduction angle design for supplying drive current to the motor, it is also possible to use a 150° or 180° conduction angle method.

The switching control signal generator 12 in the current controller 9 of a current-controlled PWM inverter according to the fifth embodiment of the present invention has been specifically described above. It should be noted, however, that the fifth embodiment specifically differs from the first embodiment in that the final result output of the switching control signal generator in the fifth embodiment is that all of the switching control signals PHU, PHV, PHW, PLU, PLV, and PLW are LOW, whereas in the first embodiment two of the first, second, and third switching control signals PHU, PHV, and PHW are HIGH.

Note that a free-running state results when all of the switching control signals PHU, PHV, PHW, PLU, PLV, and PLW are LOW, and each of the line currents IU, IV, and IW converge to zero through a current-circulating diode.

More specifically, by outputting all of the switching control signals PHU, PHV, PHW, PLU, PLV, and PLW LOW when the current comparison result R1 changes, the current level of each of the line currents IU, IV, and IW drops, and it is therefore possible to control the line current by means of this fifth embodiment with the same effect as line current control by the current-controlled PWM inverter of the first embodiment.

Embodiment 6

A current-controlled PWM inverter according to the sixth embodiment of the present invention is described next below with reference to the accompanying figures.

Figure 12:
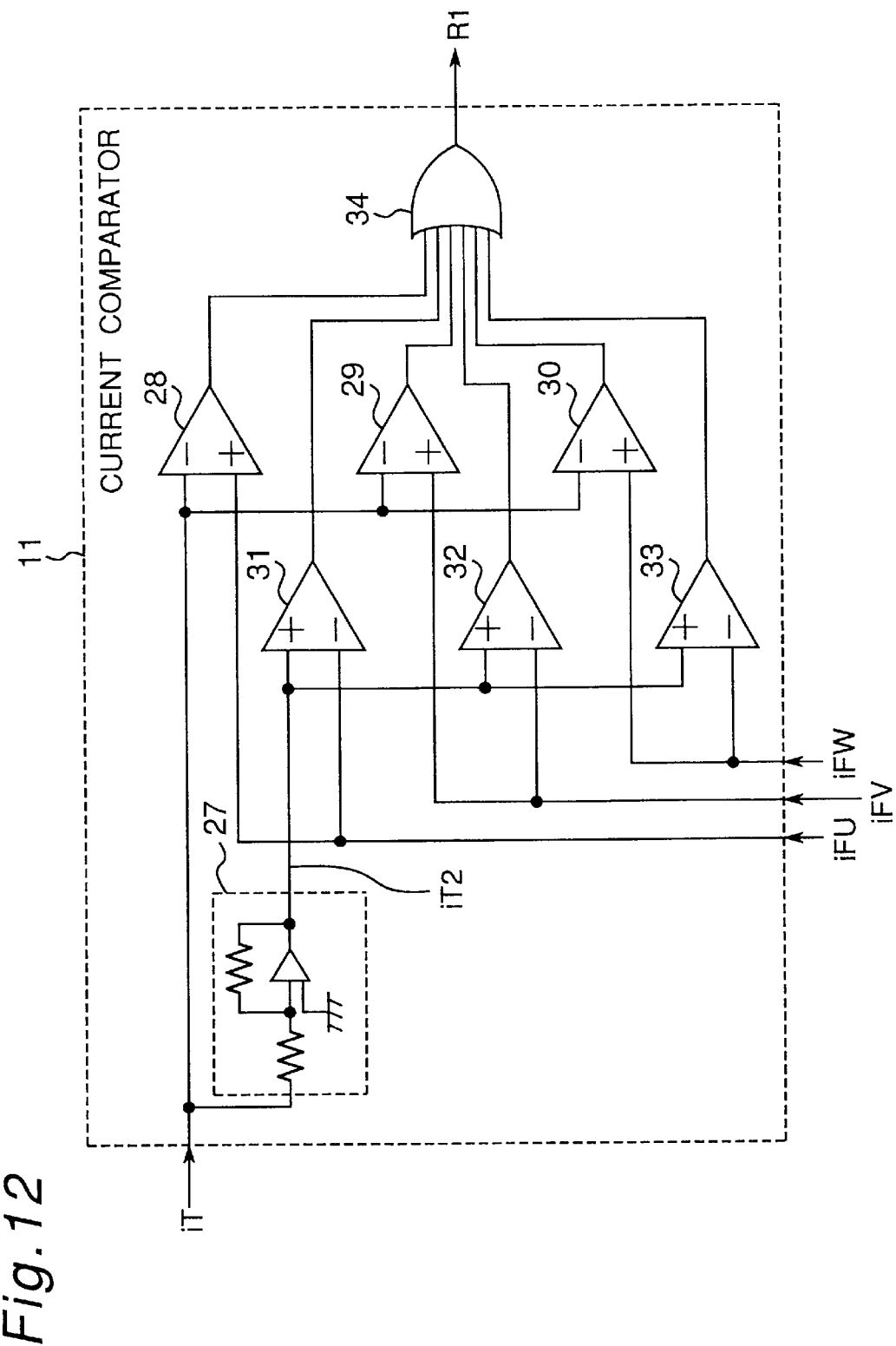
FIG. 12 and FIG. 13 are block diagrams of the current comparing means in the sixth and seventh embodiments of the present invention, respectively.

A current-controlled PWM inverter according to the sixth embodiment of the invention is substantially identical to that of the first embodiment shown in FIG. 1, and differs in the internal structure of the current comparator 11, which is shown in the block diagram of FIG. 12.

Because this sixth embodiment is identical to the first embodiment except for the internal structure and operation of the current comparator 11, only the construction and operation of the current comparator 11 of this sixth embodiment are described below.

The structure of the current comparator 11 according to the sixth embodiment is described below with reference to FIG. 12, a block diagram of the current comparator 11.

As shown in FIG. 12, this current comparator 11 comprises a first sign inverter 27 for inverting the sign of the current control signal iT and outputting the resulting inverted-sign current control signal iT2; first, second, and third comparators 28, 29, and 30; fourth, fifth, and sixth comparators 31, 32, and 33; and a first OR gate 34.

The first, second, and third comparators 28, 29, and 30 compare the current control signal iT with the first, second, and third line current detection results iFU, iFV, and iFW, and output as a HIGH signal any of the first, second, and third line current detection results iFU, iFV, and iFW that are greater than the current control signal iT.

The fourth, fifth, and sixth comparators 31, 32, and 33 similarly compare the inverted-sign current control signal iT2 with the first, second, and third line current detection results iFU, iFV, and iFW, and output as a HIGH signal any of the first, second, and third line current detection results iFu, iFV, and iFW that are greater than the inverted-sign current control signal iT2.

The first OR gate 34 then performs a logical OR operation on the outputs from the first, second, third, fourth, fifth, and sixth comparators 28, 29, 30, 31, 32, and 33.

The operation of this current comparator 11 is described in detail below with reference to FIG. 12 for each of two cases, when all of the line current detection results iFU, iFV, and iFW are less than the current control signal iT and greater than the inverted-sign current control signal iT2, and when at least one of the first, second, and third line current detection results iFU, iFV, and iFW is greater than the current control signal iT or less than the inverted-sign current control signal iT2.

In the former case, i.e., when all of the line current detection results iFU, iFV, and iFW are less than the current control signal iT and greater than the inverted-sign current control signal iT2, the first, second, and third comparators 28, 29, and 30 output LOW, and the fourth, fifth, and sixth comparators 31, 32, and 33 also output LOW. The current comparison result R1, which is the output from the first OR gate 34, is therefore LOW.

In the latter case, i.e., when at least one of the first, second, and third line current detection results iFU, iFV, and iFW is greater than the current control signal iT or less than the inverted-sign current control signal iT2, at least one of the first to sixth comparators 28, 29, 30, 31, 32, and 33 outputs HIGH. This results in the current comparison result R1 output from the first OR gate 34 being HIGH.

As will be known from the description of the specific operation of the current comparator 11 in the current controller 9 of a current-controlled PWM inverter according to this sixth embodiment of the present invention, the current comparator 11 of this sixth embodiment differs from that of the first embodiment in structure only and the conditions under which the current comparison result R1 is output HIGH are the same in both first and sixth embodiments. These conditions are, specifically when

|iFU|>iT, or

|iFV|>iT, or

|iFW|>iT.

As a result, the current comparator 11 outputting the current comparison result R1 are functionally identical and the line current of the motor 1 can therefore be comparably controlled.

It should be further noted that while this sixth embodiment has been described with specific reference to the structure of the current comparator 11 of the first embodiment above, the current comparator 11 of this embodiment can be substituted for that of the second, third, and fourth embodiments with identical effect.

Embodiment 7

A current-controlled PWM inverter according to the seventh embodiment of the present invention is described next below with reference to the accompanying figures.

Figure 13:
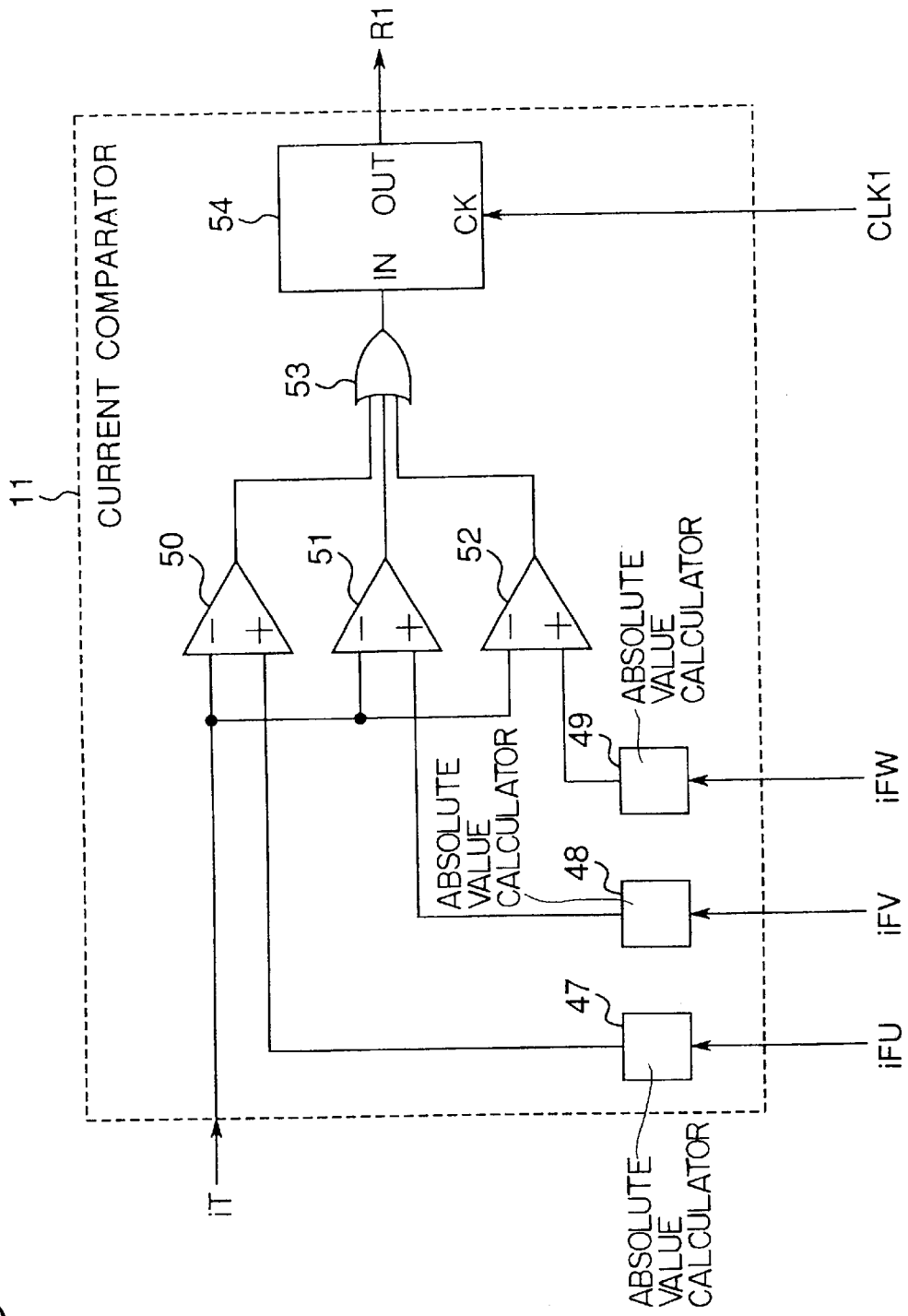

A current-controlled PWM inverter according to the seventh embodiment of the invention is substantially identical to that of the first embodiment shown in FIG. 1, and differs in the internal structure of the current comparator 11, which is shown in the block diagram of FIG. 13.

The current comparator 11 of this seventh embodiment differs from that of the first embodiment shown in FIG. 3 by the addition of a first read-twice logic circuit 54 as shown in FIG. 13. As a result, only the construction and operation of the current comparator 11 of this seventh embodiment are described below.

Figure 14:
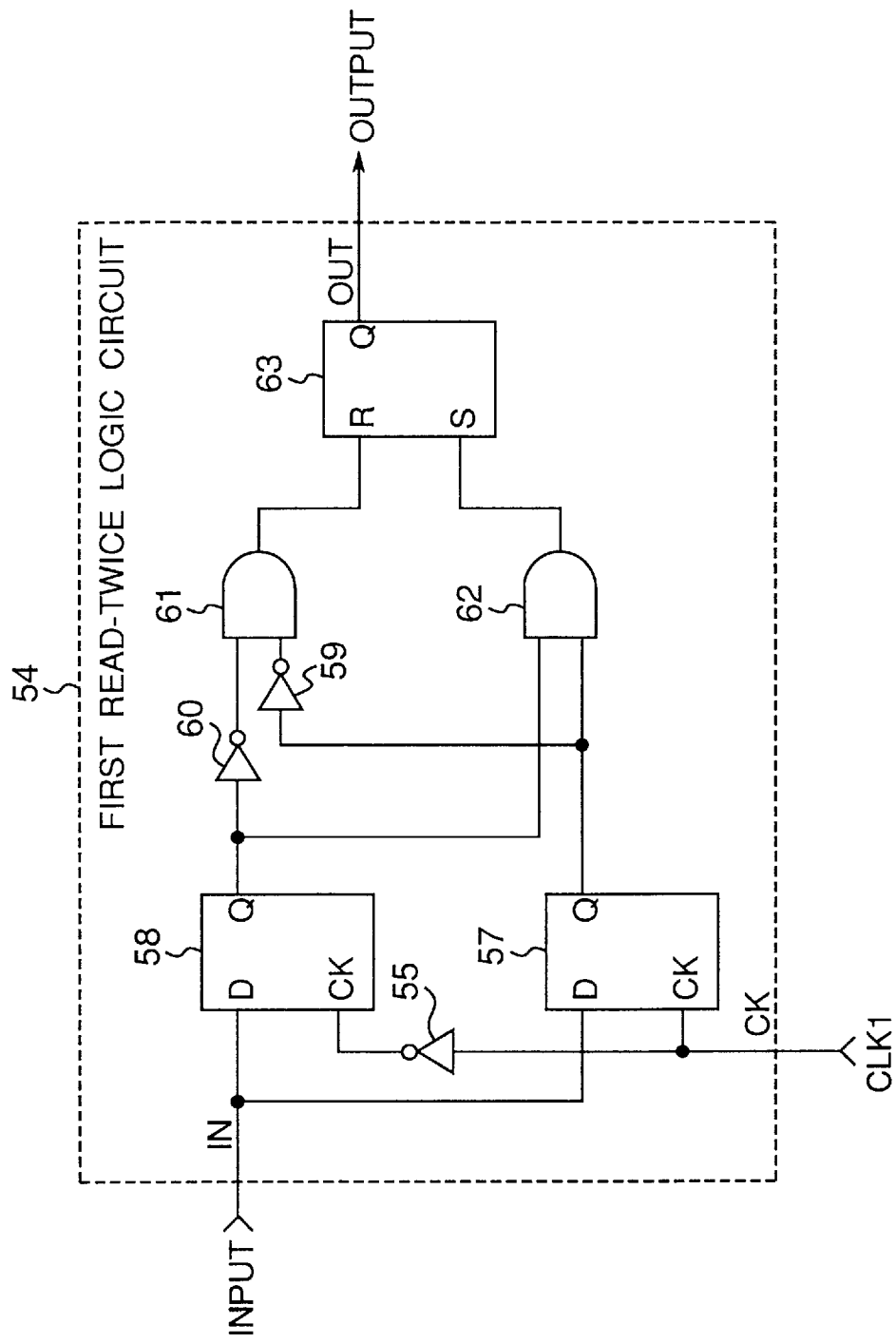
FIG. 14 is a block diagram of the read-twice logic circuit shown in FIG. 13.

The structure and operation of this first read-twice logic circuit 54 are described below with reference to FIG. 14. The first and second D flip-flops 57 and 58 latch the level of input terminal D at the rise timing of the signal input to the input terminal CK, and output the latched D input terminal level from the output terminal Q. Note that the D input terminals of the first and second D flip-flops 57 and 58 are connected to a common bus from which the output signal of the second OR gate 53 is input from the input terminal IN of the first read-twice logic circuit 54.

The system clock signal CLK1 is input to the CK input terminal of the first D flip-flop 57, and is input through a ninth logic inversion gate 55 to the CK input terminal of the second D flip-flop 58.

The seventh and eighth logic inversion gates 59 and 60 output LOW when a HIGH signal is applied to the respective input terminals, and output HIGH when a LOW signal is applied to the respective input terminals.

The second RS flip-flop 63 is reset when input terminal R is HIGH and input terminal S is LOW, and thus outputs LOW from the output terminal Q. When input terminal R is LOW and input terminal S is HIGH, the second RS flip-flop 63 is set and thus outputs HIGH from the output terminal Q.

The thirteenth and fourteenth AND gates 61 and 62 output HIGH when a HIGH level signal is applied to both input terminals, and output LOW otherwise.

The operation of the individual components of the first read-twice logic circuit 54 described above results in first read-twice logic circuit operation as described below by tracking the signal flow.

The output signal of the second OR gate 53 is input to input terminal IN of the first read-twice logic circuit 54 at the rise timing of the system clock signal CLK1. The level of this input signal is then latched and held by the first D flip-flop 57 and output from output terminal Q.

The output signal of the second OR gate 53 is next input to input terminal IN of the first read-twice logic circuit 54 at the fall of the system clock signal CLK1. The level of this input signal is then latched and held by the second D flip-flop 58 and output from output terminal Q.

The output levels of the output terminals Q of the first and second D flip-flops 57 and 58 are both supplied directly to the fourteenth AND gate 62 and supplied filtered through the seventh and eighth logic inversion gates 59 and 60 to the thirteenth AND gate 61. The output from the thirteenth AND gate 61 is supplied to input terminal R of the second RS flip-flop 63, and the output from the fourteenth AND gate 62 is supplied to input terminal S of the second RS flip-flop 63. The resulting output Q from the second RS flip-flop 63 is then output as the current comparison result R1 from the output terminal of the first read-twice logic circuit 54.

As a result of this operation, the level of the signal applied to the input terminal IN of the first read-twice logic circuit 54 is checked at both the rise and fall of the system clock signal CLK1, the current comparison result R1 is set HIGH when the input signal level is HIGH twice consecutively, and the current comparison result R1 is set LOW when the input signal level is LOW twice consecutively.

By means of this internal operation, the first read-twice logic circuit 54 can generate a current comparison result R1 from which short-term signal fluctuations, e.g., a HIGH→LOW→HIGH or LOW→HIGH→LOW level change, resulting from noise in the output signal of the second OR gate 53 are removed. Note that while only two D flip-flops are shown in FIG. 14, it is also possible to provide three or more D flip-flops, obtain the AND of all D flip-flop outputs, and thus set to three or more the number of times the input signal level is read at the rise and fall of the system clock signal CLK1.

By thus providing a first read-twice logic circuit 54 through which the output of the second OR gate 53 of the current comparator 11 is passed before being output to the switching control signal generator 12, it is possible by means of this seventh embodiment to remove noise superimposed to the first, second, and third line current detection results iFU, iFV, and iFW and the current control signal iT, and thereby precisely control the line current supplies to the motor 1 to the current control signal iT even under noisy conditions.

It should be further noted that the first read-twice logic circuit of this seventh embodiment can be added to the current comparator 11 of the first, second, third, fourth, or sixth embodiments with identical effect.

Embodiment 8

A current-controlled PWM inverter according to the eighth embodiment of the present invention is described next below with reference to the accompanying figures.

Figure 15:
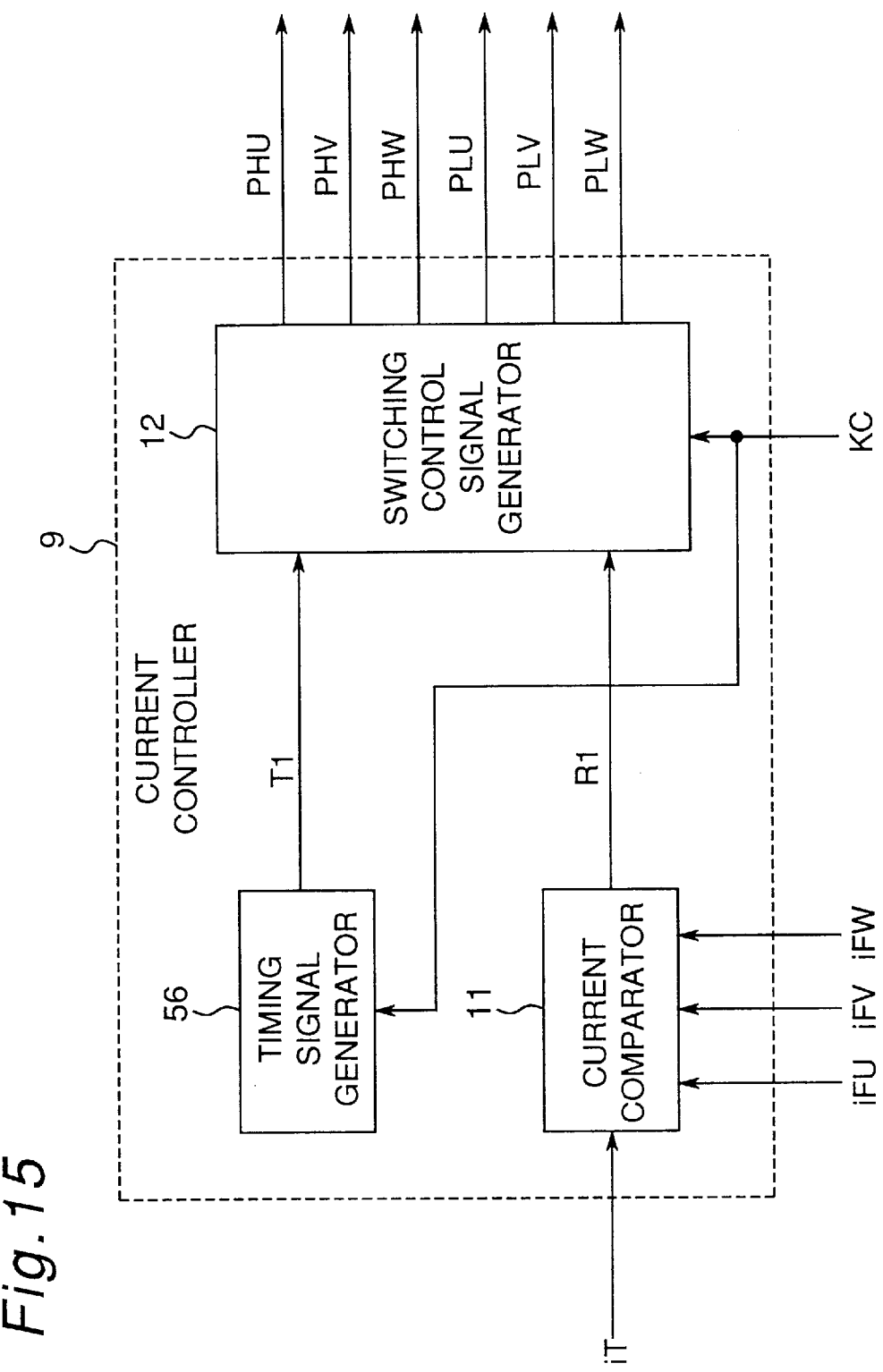
FIG. 15 is a block diagram of the current control means of the eighth embodiment of the present invention.

A current-controlled PWM inverter according to the eighth embodiment of the invention is substantially identical to that of the first embodiment shown in FIG. 1, and differs in the internal structure of the current controller 9, which is shown in the block diagram of FIG. 15.

The only difference between the current controller 9 of this eighth embodiment and that of the first embodiment is that the timing signal generator 56 of this embodiment resynchronizes at the commutation timing and outputs a periodic refresh timing signal T1.

Figure 16:
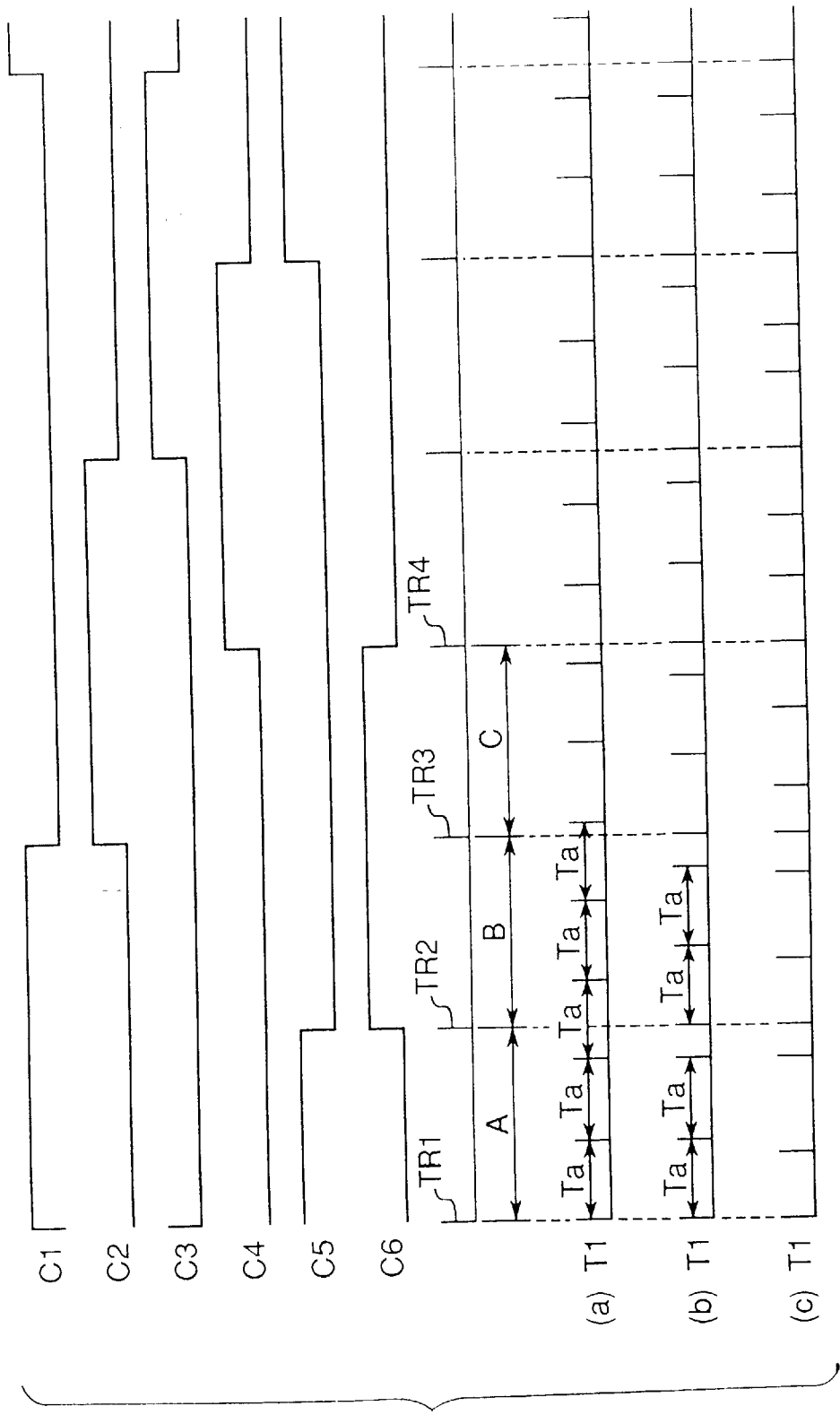
FIG. 16 is used to describe the operation of the current control means shown in FIG. 15.

Because the current controller 9 of this embodiment differs from that of the first embodiment only in the structure of the timing signal generator as described above, only the operation of this timing signal generator 56 is described below with reference to FIG. 16. Note that while a 120°, 150°, or 180° conduction angle method may be used to drive the motor, the present embodiment is described below using a 120° conduction angle method by way of example only. Note, further, that the commutation timing is the timing at which any of the first, second, third, fourth, fifth, and sixth selection signals S1–S6 output from the main circuit switching power element selector 13 changes from LOW to HIGH or from HIGH to LOW as shown by TR1, TR2, TR3, and TR4 in FIG. 16. For simplicity below the period from first commutation timing TR1 to second commutation timing TR2 in FIG. 16 is referred to as period A, the period from second commutation timing TR2 to third commutation timing TR3 as period B, and the period from third commutation timing TR3 to fourth commutation timing TR4 as period C.

The case in which refresh timing signal T1 is generated at a constant period Ta and is not resynchronized to the commutation timing is described first below with reference to row (a) in FIG. 16. It is further assumed below that the first output of the refresh timing signal T1 in this example is synchronized to the beginning of period A.

First, the refresh timing signal T1 is output at the beginning of period A. After time Ta the next refresh timing signal T1 is output, another refresh timing signal T1 is then output after waiting another time Ta, and the refresh timing signal T1 is output thereafter after each time Ta. If the output timing of the refresh timing signal T1 is examined in each of the periods A, B, and C, it will be noted that the refresh timing signal T1 is output three times each in periods A and C, but only twice in period B. This change in the number of refresh timing signals T1 results in a variation in the applied line voltages of the motor. When the motor speed is high and the refresh timing period is long, i.e., when the difference between the refresh timing period and the commutation timing period is small, this produces current ripples and torque fluctuations in the motor.

The case in which refresh timing signal T1 is generated at a constant period Ta and is resynchronized to the commutation timing is described first below with reference to row (b) in FIG. 16.

The refresh timing signal T1 is first output synchronized to the first commutation timing TR1. The next refresh timing signal T1 is then output after time Ta, and another refresh timing signal T1 is then output in period A after waiting another time Ta. At the second commutation timing TR2 the refresh timing signal T1 is resynchronized to the second commutation timing TR2, and the same operation described above is repeated thereafter to output the refresh timing signal T1 in periods B and C. By thus resynchronizing output of the refresh timing signal T1 to the commutation timing TR, the refresh timing signal T1 is output three times each in each period A, B, and C.

The timing signal generator 56 of this eighth embodiment thus assures that the refresh timing signal T1 is output the same number of times in each commutation timing period.

By thus building the timing signal generator of the current controller 9 to resynchronize to the commutation timing and output the refresh timing signal T1 at a constant period as described above, the eighth embodiment of the invention prevents variation in the line voltages applied to the motor, and thereby prevents current ripples and torque fluctuations in the motor even when the motor speed is high and the refresh timing period is long, i.e., when the difference between the refresh timing period and the commutation timing period is small.

Note that the same effect can be achieved by resynchronizing even when the period of the refresh timing signal T1 is made non-uniform as a means of reducing noise in the carrier frequency component of PWM control as shown in row (c) in FIG. 16.

Note, further, that while the above embodiment has been described using a 120° conduction angle design for supplying drive current to the motor, it is also possible to use a 150° or 180° conduction angle method.

It should be further noted that the timing signal generator 56 of this eighth embodiment can be added to the current comparator 11 of the first, second, third, fourth, sixth or seventh embodiments with identical effect.

Embodiment 9

A current-controlled PWM inverter according to the ninth embodiment of the present invention is described next below with reference to the accompanying figures.

Figure 17:
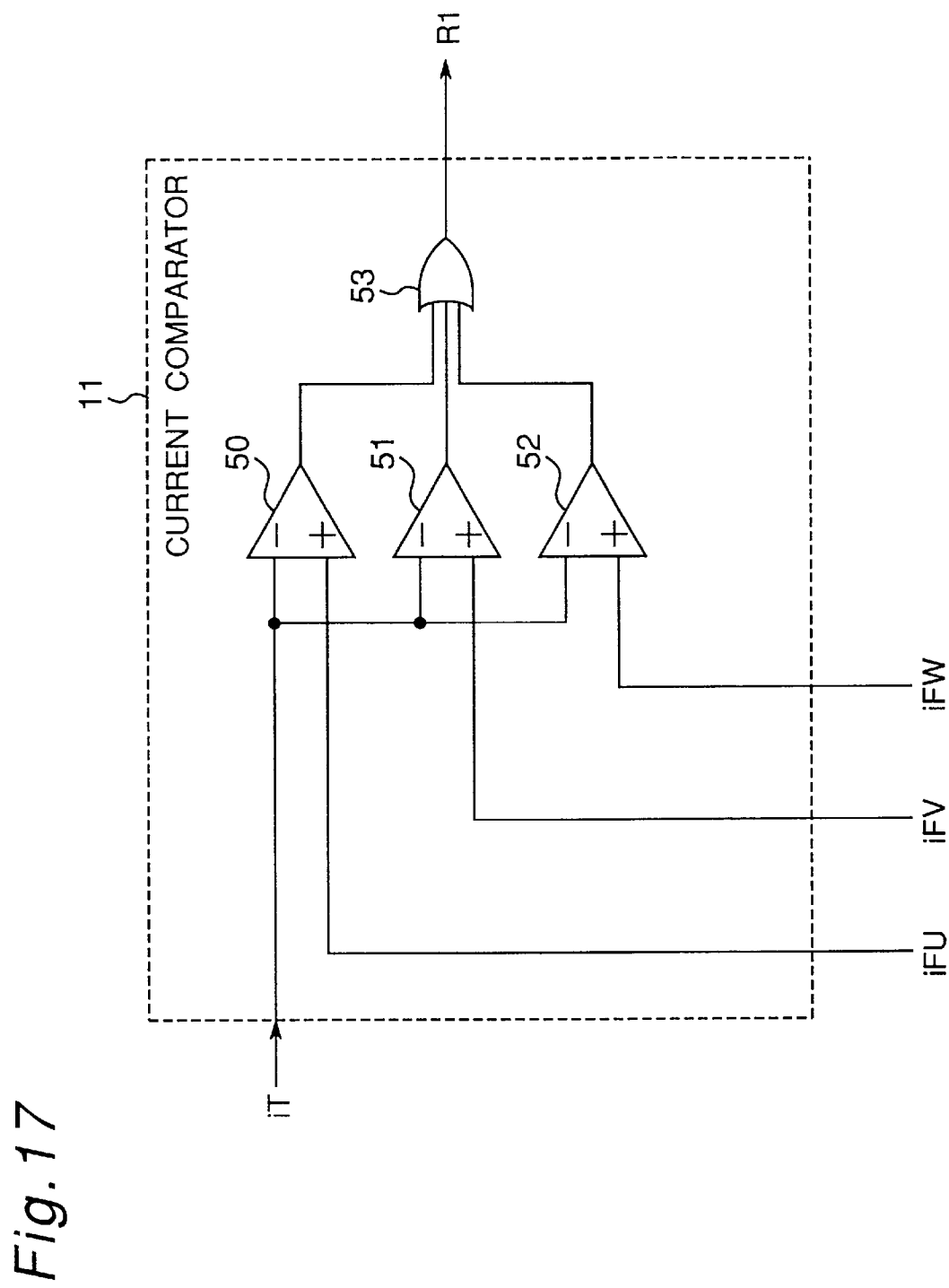
FIG. 17 and FIG. 18 are block diagrams of the current comparing means in the ninth and tenth embodiments of the present invention, respectively.

A current-controlled PWM inverter according to the ninth embodiment of the invention is substantially identical to that of the first embodiment shown in FIG. 1, and differs only in the internal structure of the current comparator 11, which is shown in the block diagram of FIG. 17. Only the structure and operation of the current comparator 11 of the ninth embodiment are therefore described below with reference to FIG. 17.

The current control signal iT and the first, second, and third line current detection results iFU, iFV, and iFW, respectively, are input to the seventh, eighth, and ninth comparators 50, 51, and 52, which output HIGH when the value of the current control signal iT is less than the first, second, and third line current detection results iFU, iFV, and iFW, respectively. These seventh, eighth, and ninth comparators 50, 51, and 52 output to a second OR gate 53, which thus outputs a HIGH level signal as the current comparison result R1 when any one of the first, second, and third line current detection results iFU, iFV, and iFW is greater than the current control signal iT.

The operation of the current comparator 11 is described next with reference again to FIG. 17 and two operating scenarios: when all of the line current detection results iFU, iFV, and iFW are less than the current control signal iT, and when at least one of the first, second, and third line current detection results iFU, iFV, and iFW is greater than the current control signal iT.

In the former case, i.e., when all of the line current detection results iFU, iFV, and iFW are less than the current control signal iT, the seventh, eighth, and ninth comparators 50, 51, and 52 output LOW. The current comparison result R1, which is the output from the second OR gate 53, is therefore LOW.

In the latter case, i.e., when at least one of the first, second, and third line current detection results iFU, iFV, and iFW is greater than the current control signal iT, one of the seventh, eighth, and ninth comparators 50, 51, and 52 outputs HIGH, specifically the comparator to which a HIGH line current detection result is input. The current comparison result R1, which is the output from the second OR gate 53, is therefore HIGH.

The current comparator 11 of the ninth embodiment is thus simply constructed to input the current control signal iT and the first, second, and third line current detection results iFU, iFV, and iFW to the seventh, eighth, and ninth comparators 50, 51, and 52 so that a HIGH current comparison result R1 is output when any one of the detection results iFU, iFV, and iFW is greater than the current control signal iT, and a LOW current comparison result R1 is output at all other times. It is thereby possible to match the line current of the motor 1 to the current control signal simply and precisely.

Note, further, that the current comparator 11 of this embodiment can be provided at low cost because of its simple construction comprising only the seventh, eighth, and ninth comparators 50, 51, and 52 and second OR gate 53.

It should be further noted that the structure of the current comparator 11 of this ninth embodiment only differs from that of the first embodiment, and the current comparator 11 of this embodiment can therefore be substituted for the current comparator 11 of the first, second, third, or fourth embodiments with identical effect.

Embodiment 10

A current-controlled PWM inverter according to the tenth embodiment of the present invention is described next below with reference to the accompanying figures.

Figure 18:
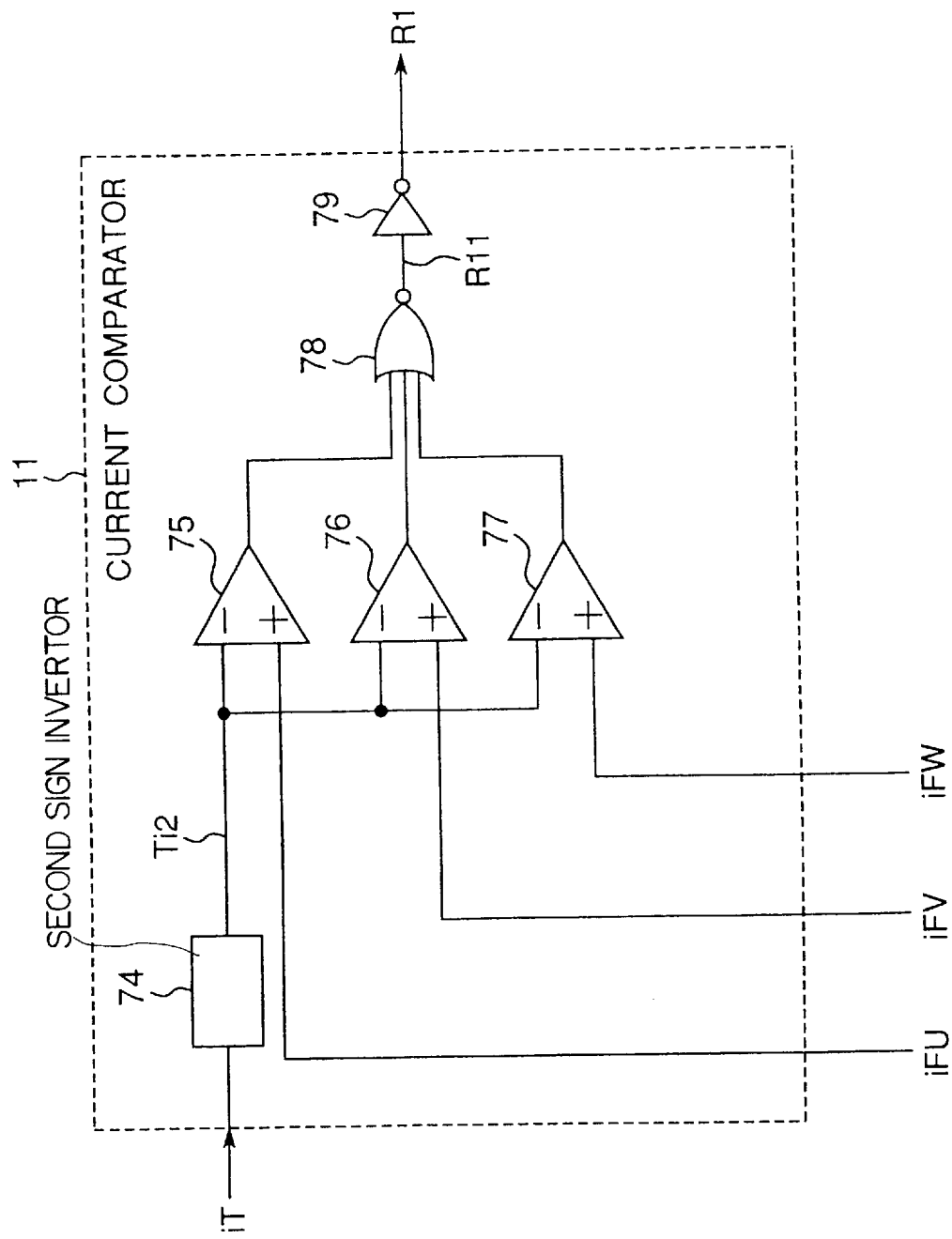
Figure 19:
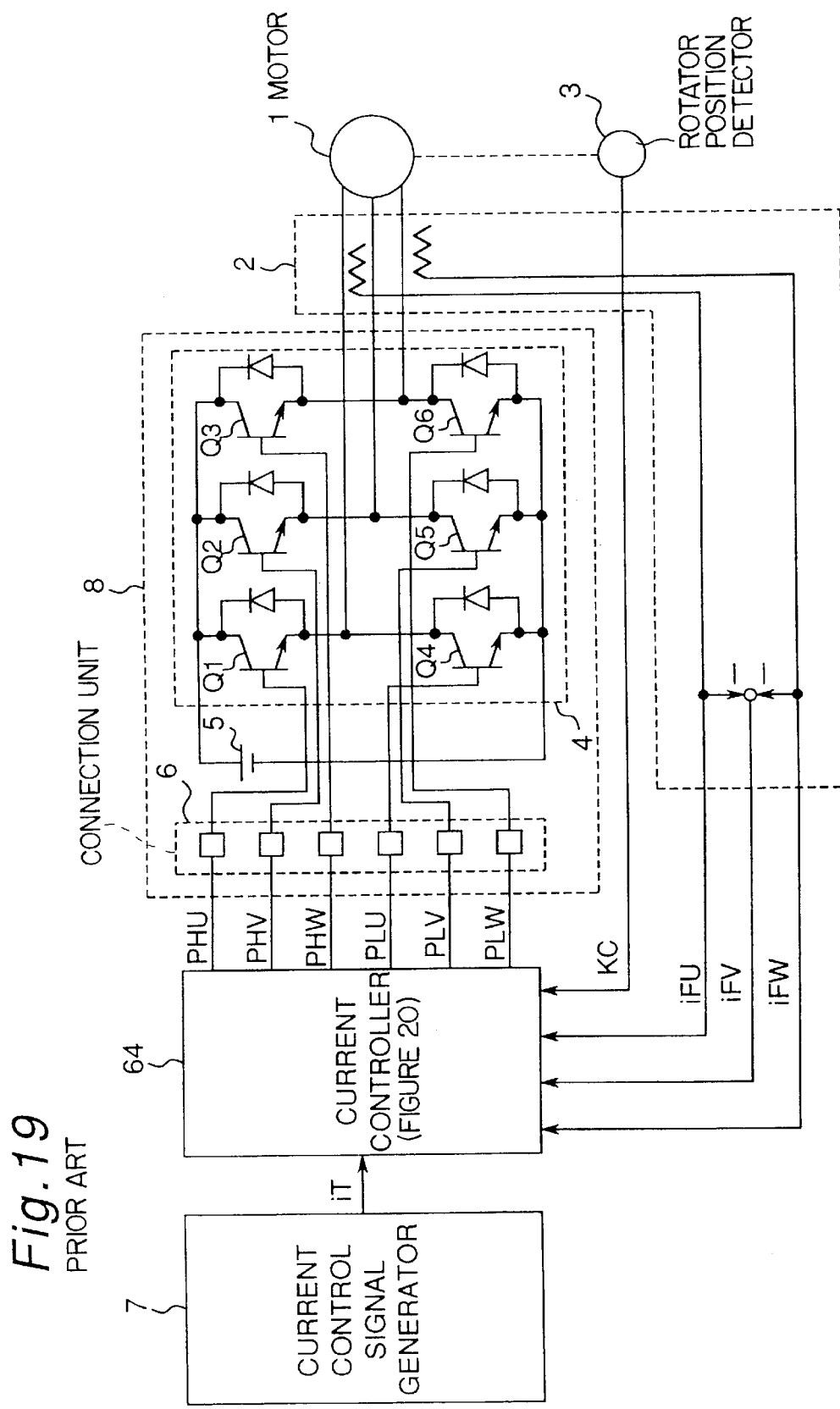
FIG. 19 is a system diagram of a conventional current-controlled PWM inverter system.
Figure 20:
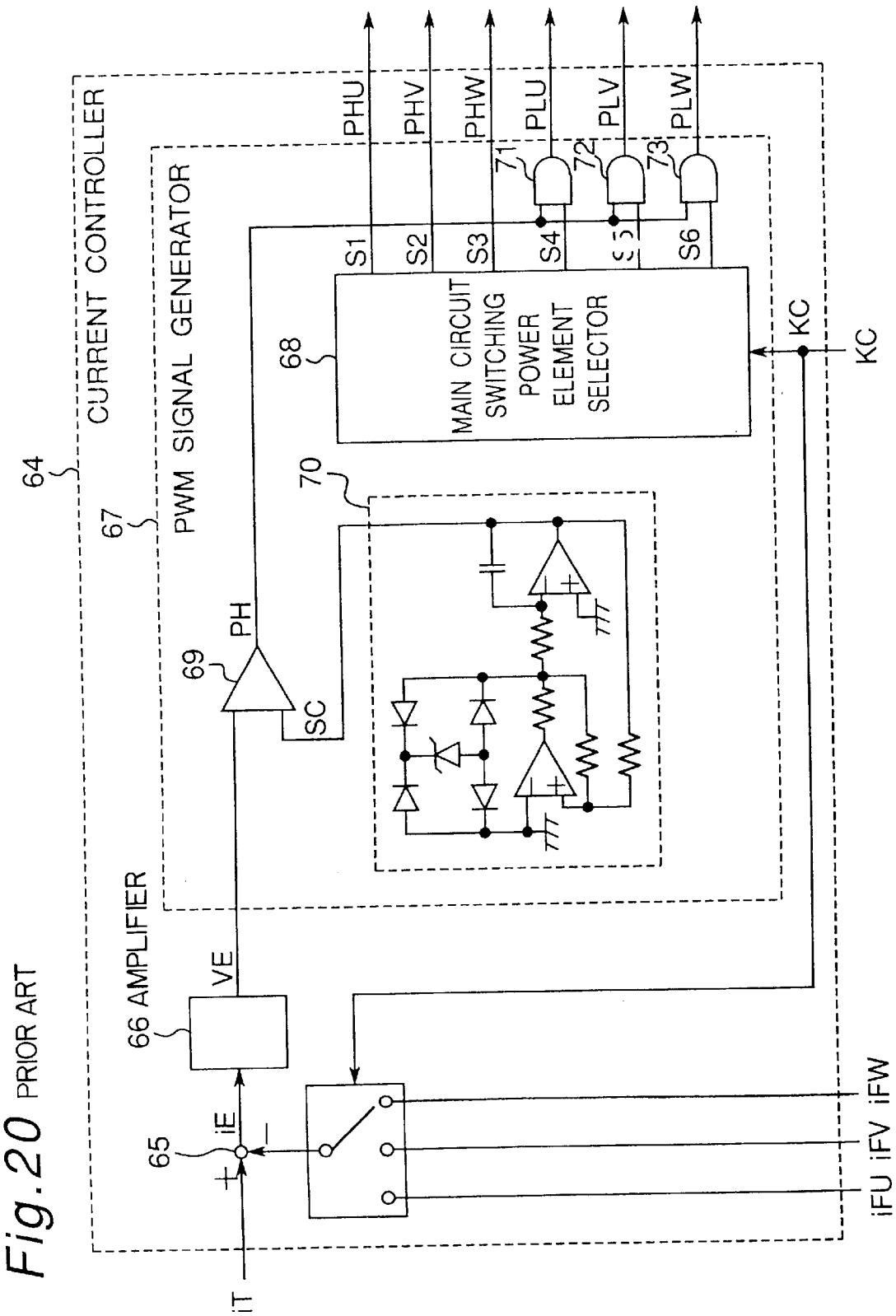
FIG. 20 is a block diagram of the current control means shown in FIG. 19.
Figure 21:
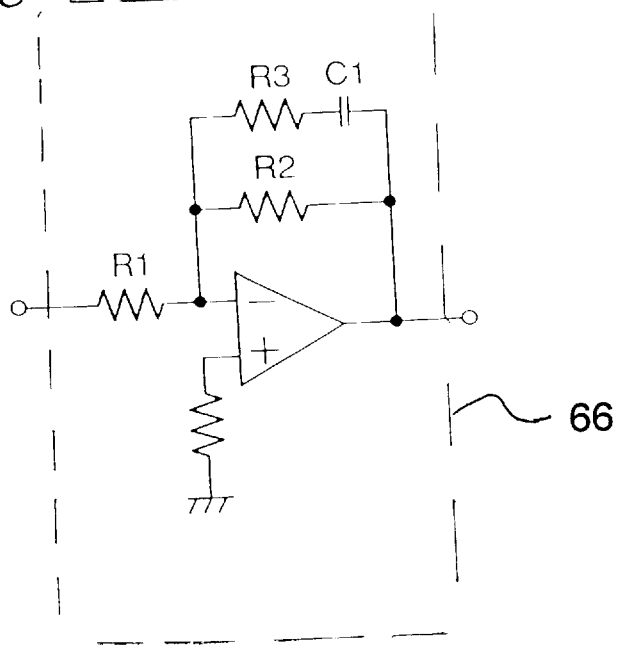
FIG. 21 is a block diagram of a conventional current error amplifier as shown in FIG. 20.

A current-controlled PWM inverter according to the tenth embodiment of the invention is substantially identical to that of the first embodiment shown in FIG. 1, and differs only in the internal structure of the current comparator 11, which is shown in the block diagram of FIG. 18. Only the structure and operation of the current comparator 11 of the tenth embodiment are therefore described below with reference to FIG. 18.

As shown in FIG. 18, this current comparator 11 comprises a second sign inverter 74, tenth, eleventh, and twelfth comparators 75, 76, and 77, a first NOR gate 78, and a tenth logic inversion gate 79.

The second sign inverter 74 inverts the sign of the supplied current control signal iT and outputs the resulting inverted-sign current control signal iT2 to each of the tenth, eleventh, and twelfth comparators 75, 76 and 77. The tenth, eleventh, and twelfth comparators 75, 76, and 77 thus compare the inverted-sign current control signal iT2 with the respectively supplied first, second, and third line current detection results iFU, iFV, and iFW, and output HIGH to the first NOR gate 78 if the inverted-sign current control signal iT2 is greater.

As a result, the first NOR gate 78 outputs LOW as the current comparison result R11 if any one of the first, second, and third line current detection results iFU, iFV, and iFW is less than the inverted-sign current control signal iT2. The tenth logic inversion gate 79 then inverts the logic sense of the current comparison result R11 to output the current comparison result R1.

The operation of this current comparator 11 is described in detail below with reference to FIG. 18 for each of two cases, when all of the line current detection results iFU, iFV, and iFW are greater than the inverted-sign current control signal iT2, and when at least one of the first, second, and third line current detection results iFU, iFV, and iFW is less than the inverted-sign current control signal iT2.

In the former case, i.e., when all of the line current detection results iFU, iFV, and iFW are greater than the inverted-sign current control signal iT2, the tenth, eleventh, and twelfth comparators 75, 76, and 77 output LOW. This results in a HIGH current comparison result R11 from the first NOR gate 78, and a LOW current comparison result R1 output from the tenth logic inversion gate 79, and therefore the current comparator 11.

In the latter case, i.e., when at least one of the first, second, and third line current detection results iFU, iFV, and iFW is less than the inverted-sign current control signal iT2, at least one of the inverted-sign current control signal iT2, the tenth, eleventh, and twelfth comparators 75, 76, and 77 outputs HIGH. This results in a LOW current comparison result R11 from the first NOR gate 78, and a HIGH current comparison result R1 output from the tenth logic inversion gate 79, and therefore the current comparator 11.

The current comparator 11 of the tenth embodiment is thus simply constructed to input the current control signal iT and the first, second, and third line current detection results iFU, iFV, and iFW to the tenth, eleventh, and twelfth comparators 75, 76, and 77 so that a LOW current comparison result R11 is output when any one of the detection results iFU, iFV, and iFW is less than the inverted-sign current control signal iT2, and a HIGH current comparison result R1 is therefore output from the current comparator 11. It is thereby possible to match the line current of the motor 1 to the current control signal simply and precisely.

Note, further, that the current comparator 11 of this embodiment can be provided at low cost because of its simple construction.

It should be further noted that the structure of the current comparator 11 of this tenth embodiment only differs from that of the first embodiment, and the current comparator 11 of this embodiment can therefore be substituted for the current comparator 11 of the first, second, third, or fourth embodiments with identical effect.

Effect of the Invention

Because the current-controlled PWM inverter of the present invention does not comprise a current error amplifier, the problems associated with the gain adjustment of a current error amplifier are fundamentally resolved as there is no need for any gain adjustment.

Furthermore, even if the characteristics and specifications of the motor, motor current detector, current controller, or main circuit power controller change by design or as a result of manufacturing variations or temperature characteristics, the current-controlled PWM inverter constantly operates to minimize current error. The current control response characteristic is therefore also excellent, and there are no concerns about oscillation occurring.

The current controller of the current-controlled PWM inverter according to the present invention can, with the exception of the current comparator, be constructed using simple digital circuitry, and the digital circuit components are free of offset and drift, and can be achieved at low-cost.

The present invention can therefore provide a low cost current-controlled PWM inverter characterized by an excellent current control response characteristic without requiring gain or offset adjustment of the current error amplifier.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A current-controlled PWM inverter comprising:
   a motor current detection means for detecting the line current inflowing from each line of a three-phase motor, and outputting a first line current detection result, a second line current detection result, and a third line current detection result;
   a current control signal for controlling the line current supplied from each line to the three-phase motor;
   a main circuit power element group comprising plural main circuit switching power elements in a three-phase bridge configuration, each bridge configuration including a current-circulating diode;
   a direct current primary power supply for supplying power to said power element group;
   a current comparing means for outputting a LOW current comparison result only when the first line current detection result, second line current detection result, and third line current detection result are all lower than the current control signal, and
      outputting a HIGH current comparison result in all other cases;
   a timing signal generator for outputting a refresh timing signal; and
   a switching control signal generator to which said current comparison result and refresh timing signal are input for generating the switching control signal that sets the main circuit switching power elements of the main circuit power element group on or off;
   wherein the switching control signal generator determines the switching control signal controlling the on or off state of the main circuit switching power elements of the main circuit power element group at the refresh timing and at the timing at which the current comparison result changes from LOW to HIGH.

2. A current-controlled PWM inverter according to claim 1 wherein the timing signal generator is configured to resynchronize at the commutation timing.

3. A current-controlled PWM inverter according to claim 1 wherein
   the main circuit power element group comprises:
      a first main circuit switching power element connected to the positive terminal of the direct current primary power supply for supplying a first line current to the three-phase motor,
      a second main circuit switching power element connected to the positive terminal of the direct current primary power supply for supplying a second line current to the three-phase motor,
      a third main circuit switching power element connected to the positive terminal of the direct current primary power supply for supplying a third line current to the three-phase motor,
      a fourth main circuit switching power element connected to the negative terminal of the direct current primary power supply for supplying a first line current to the three-phase motor,
      a fifth main circuit switching power element connected to the negative terminal of the direct current primary power supply for supplying a second line current to the three-phase motor,
      a sixth main circuit switching power element connected to the negative terminal of the direct current primary power supply for supplying a third line current to the three-phase motor, and
      a current-circulating diode corresponding to each of the main circuit switching power elements; and
   the switching control signal generator sets one of the first, second, and third main circuit switching power elements and one of the fourth, fifth, and sixth main circuit switching power elements on at the refresh timing, and
      at the timing at which the current comparison result changes from LOW to HIGH sets the first, second, third, fourth, fifth, and sixth main circuit switching power elements off.

4. A current-controlled PWM inverter according to claim 1 wherein
   the main circuit power element group comprises:
      a first main circuit switching power element connected to the positive terminal of the direct current primary power supply for supplying a first line current to the three-phase motor,
      a second main circuit switching power element connected to the positive terminal of the direct current primary power supply for supplying a second line current to the three-phase motor,
      a third main circuit switching power element connected to the positive terminal of the direct current primary power supply for supplying a third line current to the three-phase motor,
      a fourth main circuit switching power element connected to the negative terminal of the direct current primary power supply for supplying a first line current to the three-phase motor,
      a fifth main circuit switching power element connected to the negative terminal of the direct current primary power supply for supplying a second line current to the three-phase motor,
      a sixth main circuit switching power element connected to the negative terminal of the direct current primary power supply for supplying a third line current to the three-phase motor, and
      a current-circulating diode corresponding to each of the main circuit switching power elements; and
   the switching control signal generator sets one of the first, second, and third main circuit switching power elements and one of the fourth, fifth, and sixth main circuit switching power elements on at the refresh timing, and
      at the timing at which the current comparison result changes from LOW to HIGH sets two of the first, second, and third main circuit switching power elements on, or two of the fourth, fifth, and sixth main circuit switching power elements on.

5. A current-controlled PWM inverter according to claim 1 wherein
   the main circuit power element group comprises:
      a first main circuit switching power element connected to the positive terminal of the direct current primary power supply for supplying a first line current to the three-phase motor,
      a second main circuit switching power element connected to the positive terminal of the direct current primary power supply for supplying a second line current to the three-phase motor,
      a third main circuit switching power element connected to the positive terminal of the direct current primary power supply for supplying a third line current to the three-phase motor, a fourth main circuit switching power element connected to the negative terminal of the direct current primary power supply for supplying a first line current to the three-phase motor, a fifth main circuit switching power element connected to the negative terminal of the direct current primary power supply for supplying a second line current to the three-phase motor, a sixth main circuit switching power element connected to the negative terminal of the direct current primary power supply for supplying a third line current to the three-phase motor, and a current-circulating diode corresponding to each of the main circuit switching power elements; and the switching control signal generator sets one of the first, second, and third main circuit switching power elements and one of the fourth, fifth, and sixth main circuit switching power elements on at the refresh timing, and at the timing at which the current comparison result changes from LOW to HIGH sets only one of the first, second, and third main circuit switching power elements on, or only one of the fourth, fifth, and sixth main circuit switching power elements on.

6. A current-controlled PWM inverter comprising:

a motor current detection means for detecting the line current inflowing from each line of a three-phase motor, and outputting a first line current detection result, a second line current detection result, and a third line current detection result;

a current control signal for controlling the line current supplied from each line to the three-phase motor;

a main circuit power element group comprising plural main circuit switching power elements in a three-phase bridge configuration, each bridge configuration including a current-circulating diode;

a direct current primary power supply for supplying power to said power element group;

a current comparing means for outputting a HIGH current comparison result only when the first line current detection result, second line current detection result, and third line current detection result are all higher than the current control signal, and outputting a LOW current comparison result in all other cases;

a timing signal generator for outputting a refresh timing signal; and a switching control signal generator to which said current comparison result and refresh timing signal are input for generating the switching control signal that sets the main circuit switching power elements of the main circuit power element group on or off;

wherein the switching control signal generator determines the switching control signal controlling the on or off state of the main circuit switching power elements of the main circuit power element group at the refresh timing and at the timing at which the current comparison result changes from HIGH to LOW.

7. A current-controlled PWM inverter according to claim 6 wherein the main circuit power element group comprises:

a first main circuit switching power element connected to the positive terminal of the direct current primary power supply for supplying a first line current to the three-phase motor, a second main circuit switching power element connected to the positive terminal of the direct current primary power supply for supplying a second line current to the three-phase motor, a third main circuit switching power element connected to the positive terminal of the direct current primary power supply for supplying a third line current to the three-phase motor, a fourth main circuit switching power element connected to the negative terminal of the direct current primary power supply for supplying a first line current to the three-phase motor, a fifth main circuit switching power element connected to the negative terminal of the direct current primary power supply for supplying a second line current to the three-phase motor, a sixth main circuit switching power element connected to the negative terminal of the direct current primary power supply for supplying a third line current to the three-phase motor, and a current-circulating diode corresponding to each of the main circuit switching power elements; and the switching control signal generator sets one of the first, second, and third main circuit switching power elements and one of the fourth, fifth, and sixth main circuit switching power elements on at the refresh timing, and at the timing at which the current comparison result changes from HIGH to LOW sets two of the first, second, and third main circuit switching power elements on, or two of the fourth, fifth, and sixth main circuit switching power elements on.

8. A current-controlled PWM inverter according to claim 6 wherein the main circuit power element group comprises:

a first main circuit switching power element connected to the positive terminal of the direct current primary power supply for supplying a first line current to the three-phase motor, a second main circuit switching power element connected to the positive terminal of the direct current primary power supply for supplying a second line current to the three-phase motor, a third main circuit switching power element connected to the positive terminal of the direct current primary power supply for supplying a third line current to the three-phase motor, a fourth main circuit switching power element connected to the negative terminal of the direct current primary power supply for supplying a first line current to the three-phase motor, a fifth main circuit switching power element connected to the negative terminal of the direct current primary power supply for supplying a second line current to the three-phase motor, a sixth main circuit switching power element connected to the negative terminal of the direct current primary power supply for supplying a third line current to the three-phase motor, and a current-circulating diode corresponding to each of the main circuit switching power elements; and the switching control signal generator sets one of the first, second, and third main circuit switching power elements and one of the fourth, fifth, and sixth main circuit switching power elements on at the refresh timing, and at the timing at which the current comparison result changes from HIGH to LOW sets only one of the first, second, and third main circuit switching power elements on, or only one of the fourth, fifth, and sixth main circuit switching power elements on.

9. A current-controlled PWM inverter according to claim 6 wherein
the main circuit power element group comprises:
the main circuit power element group comprising plural main circuit switching power elements in a three-phase bridge configuration comprising a current-circulating diode comprises:
a first main circuit switching power element connected to the positive terminal of the direct current primary power supply for supplying a first line current to the three-phase motor,
a second main circuit switching power element connected to the positive terminal of the direct current primary power supply for supplying a second line current to the three-phase motor,
a third main circuit switching power element connected to the positive terminal of the direct current primary power supply for supplying a third line current to the three-phase motor,
a fourth main circuit switching power element connected to the negative terminal of the direct current primary power supply for supplying a first line current to the three-phase motor,
a fifth main circuit switching power element connected to the negative terminal of the direct current primary power supply for supplying a second line current to the three-phase motor,
a sixth main circuit switching power element connected to the negative terminal of the direct current primary power supply for supplying a third line current to the three-phase motor, and
a current-circulating diode corresponding to each of the main circuit switching power elements; and
the switching control signal generator sets one of the first, second, and third main circuit switching power elements and one of the fourth, fifth, and sixth main circuit switching power elements on at the refresh timing, and
at the timing at which the current comparison result changes from HIGH to LOW sets the first, second, third, fourth, fifth, and sixth main circuit switching power elements off.

10. A current-controlled PWM inverter according to claim 6 wherein the timing signal generator is configured to resynchronize at the commutation timing.

11. A current-controlled PWM inverter comprising:
a motor current detection means for detecting the line current inflowing from each line of a three-phase motor, and outputting a first line current detection result, a second line current detection result, and a third line current detection result;
a current control signal for controlling the line current supplied from each line to the three-phase motor;
a main circuit power element group comprising plural main circuit switching power elements in a three-phase bridge configuration, each bridge configuration including a current-circulating diode;
a direct current primary power supply for supplying power to said power element group;
a current comparing means for outputting a LOW current comparison result only when the absolute value of the first line current detection result, the absolute value of the second line current detection result, and the absolute value of the third line current detection result are all lower than the current control signal, and outputting a HIGH current comparison result in all other cases;
a timing signal generator for outputting a refresh timing signal; and
a switching control signal generator to which said current comparison result and refresh timing signal are input for generating the switching control signal that sets the main circuit switching power elements of the main circuit power element group on or off;
wherein the switching control signal generator determines the switching control signal controlling the on or off state of the main circuit switching power elements of the main circuit power element group at the refresh timing and at the timing at which the current comparison result changes from LOW to HIGH.

12. A current-controlled PWM inverter according to claim 11 wherein the current comparing means comprises:
a first sign inverting means for inverting the sign of the current control signal and outputting the resulting inverted-sign current control signal,
a first comparator for comparing the first line current detection result with the current control signal,
a second comparator for comparing the second line current detection result with the current control signal,
a third comparator for comparing the third line current detection result with the current control signal,
a fourth comparator for comparing the first line current detection result with the inverted-sign current control signal,
a fifth comparator for comparing the second line current detection result with the inverted-sign current control signal, and
a sixth comparator for comparing the third line current detection result with the inverted-sign current control signal,
in a configuration whereby a logic operation is performed on the output results from the first, second, third, fourth, fifth, and sixth comparators to detect when the absolute values of the first, second, and third line current detection results are all less than the current control signal.

13. A current-controlled PWM inverter according to claim 11 wherein the current comparing means compares on a regular cycle whether the absolute values of the first, second, and third line current detection results are all less than the current control signal, and sets the current comparison result to HIGH only when said absolute values are not LOW for at least two consecutive cycles.

14. A current-controlled PWM inverter according to claim 11 wherein the timing signal generator is configured to resynchronize at the commutation timing.

15. A current-controlled PWM inverter according to claim 11 wherein
the main circuit power element group comprises:
a first main circuit switching power element connected to the positive terminal of the direct current primary power supply for supplying a first line current to the three-phase motor,
a second main circuit switching power element connected to the positive terminal of the direct current primary power supply for supplying a second line current to the three-phase motor,
a third main circuit switching power element connected to the positive terminal of the direct current primary power supply for supplying a third line current to the three-phase motor,
a fourth main circuit switching power element connected to the negative terminal of the direct current primary power supply for supplying a first line current to the three-phase motor, a fifth main circuit switching power element connected to the negative terminal of the direct current primary power supply for supplying a second line current to the three-phase motor, a sixth main circuit switching power element connected to the negative terminal of the direct current primary power supply for supplying a third line current to the three-phase motor, and a current-circulating diode corresponding to each of the main circuit switching power elements; and the switching control signal generator sets one of the first, second, and third main circuit switching power elements and one of the fourth, fifth, and sixth main circuit switching power elements on at the refresh timing, and at the timing at which the current comparison result changes from LOW to HIGH sets two of the first, second, and third main circuit switching power elements on, or two of the fourth, fifth, and sixth main circuit switching power elements on.

16. A current-controlled PWM inverter according to claim 11 wherein the main circuit power element group comprises:

a first main circuit switching power element connected to the positive terminal of the direct current primary power supply for supplying a first line current to the three-phase motor, a second main circuit switching power element connected to the positive terminal of the direct current primary power supply for supplying a second line current to the three-phase motor, a third main circuit switching power element connected to the positive terminal of the direct current primary power supply for supplying a third line current to the three-phase motor, a fourth main circuit switching power element connected to the negative terminal of the direct current primary power supply for supplying a first line current to the three-phase motor, a fifth main circuit switching power element connected to the negative terminal of the direct current primary power supply for supplying a second line current to the three-phase motor, a sixth main circuit switching power element connected to the negative terminal of the direct current primary power supply for supplying a third line current to the three-phase motor, and a current-circulating diode corresponding to each of the main circuit switching power elements; and the switching control signal generator sets one of the first, second, and third main circuit switching power elements and one of the fourth, fifth, and sixth main circuit switching power elements on at the refresh timing, and at the timing at which the current comparison result changes from LOW to HIGH sets only one of the first, second, and third main circuit switching power elements on, or only one of the fourth, fifth, and sixth main circuit switching power elements on.

17. A current-controlled PWM inverter according to claim 11 wherein the main circuit power element group comprises:

a first main circuit switching power element connected to the positive terminal of the direct current primary power supply for supplying a first line current to the three-phase motor, a second main circuit switching power element connected to the positive terminal of the direct current primary power supply for supplying a second line current to the three-phase motor, a third main circuit switching power element connected to the positive terminal of the direct current primary power supply for supplying a third line current to the three-phase motor, a fourth main circuit switching power element connected to the negative terminal of the direct current primary power supply for supplying a first line current to the three-phase motor, a fifth main circuit switching power element connected to the negative terminal of the direct current primary power supply for supplying a second line current to the three-phase motor, a sixth main circuit switching power element connected to the negative terminal of the direct current primary power supply for supplying a third line current to the three-phase motor, and a current-circulating diode corresponding to each of the main circuit switching power elements; and the switching control signal generator sets one of the first, second, and third main circuit switching power elements and one of the fourth, fifth, and sixth main circuit switching power elements on at the refresh timing, and at the timing at which the current comparison result changes from LOW to HIGH sets the first, second, third, fourth, fifth, and sixth main circuit switching power elements off.

* * * * *